US012135200B2

(12) United States Patent
Ohira et al.

(10) Patent No.: US 12,135,200 B2
(45) Date of Patent: Nov. 5, 2024

(54) INFORMATION PROCESSING EQUIPMENT, INFORMATION PROCESSING METHODS, AND PROGRAMS

(71) Applicant: NIPPON TELEGRAPH AND TELEPHONE CORPORATION, Tokyo (JP)

(72) Inventors: Toshiya Ohira, Musashino (JP); Yukihiro Goto, Musashino (JP); Ryuji Honda, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 265 days.

(21) Appl. No.: 17/635,557

(22) PCT Filed: Aug. 26, 2019

(86) PCT No.: PCT/JP2019/033266
§ 371 (c)(1),
(2) Date: Feb. 15, 2022

(87) PCT Pub. No.: WO2021/038681
PCT Pub. Date: Mar. 4, 2021

(65) Prior Publication Data
US 2022/0268566 A1 Aug. 25, 2022

(51) Int. Cl.
G01B 11/02 (2006.01)
G01B 1/00 (2006.01)
(Continued)

(52) U.S. Cl.
CPC .......... G01B 11/026 (2013.01); G01B 11/002 (2013.01); G01B 11/03 (2013.01); G01C 3/00 (2013.01)

(58) Field of Classification Search
CPC ..... G01B 11/026; G01B 11/002; G01B 11/03; G01C 3/00
See application file for complete search history.

(56) References Cited

FOREIGN PATENT DOCUMENTS

| JP | 2015224980 A | * 12/2015 | ............. G01B 11/16 |
| JP | 2018195240 A | 12/2018 | |
| JP | 201952959 A | 4/2019 | |

OTHER PUBLICATIONS

Mobile Mapping System (MMS), Aisan Technology Co., Ltd, Aug. 2, 2019 (Reading Day), http://www.whatmms.com/.
(Continued)

Primary Examiner — Jamil Ahmed
(74) Attorney, Agent, or Firm — Harness, Dickey & Pierce, P.L.C.

(57) ABSTRACT

An object of the present invention is to provide an information processing apparatus, an information processing method, and a program, which are capable of determining an owner of an attachment attached to a facility using a solid model of a facility extracted from three-dimensional point group data. The present invention determines the owner of the attachment from a planar positional relationship between the solid model of a columnar structure and the solid model of the attachment in the solid model. For example, a distance between a utility pole and a center of a point (a center of a ground boundary) at which a branch line or a post reaches a ground is acquired, and whether the branch line or the post is owned by a communication company or an electric power company is determined based on whether the distance exists in a constant threshold determined by the communication company or the electric power company.

8 Claims, 31 Drawing Sheets

(51) Int. Cl.
*G01B 11/00* (2006.01)
*G01B 11/03* (2006.01)
*G01C 3/00* (2006.01)

(56) References Cited

OTHER PUBLICATIONS

Chiharu Matsumoto et al., Study of the method for selecting inspection target facilities from 3D models, 2018 IEICE Communication Society Conference, Sep. 11, 2018, p. 243.

* cited by examiner

Fig. 20

| Determination Target | Specific Point | Height Reference | Relative Distance Between Top of Post and Specific Point | Positional Relationship of Top Post with Respect to Specific Point | Cable Owner | Ownership Organization Determination |
|---|---|---|---|---|---|---|
| Solid Model of Post | Attaching Position in Solid Model of Cable | Specific Point (Attaching Position Height of Solid Model of Cable) | Large (> a) | Top is Located Above | — | Electric Power Company |
| | | | | | | Communication Company |
| | | | Small (≤ a) | Top is Located Below | Electric Power Company | Electric Power Company |
| | | | | | Communication Company | Communication Company |

Fig. 28
(A)
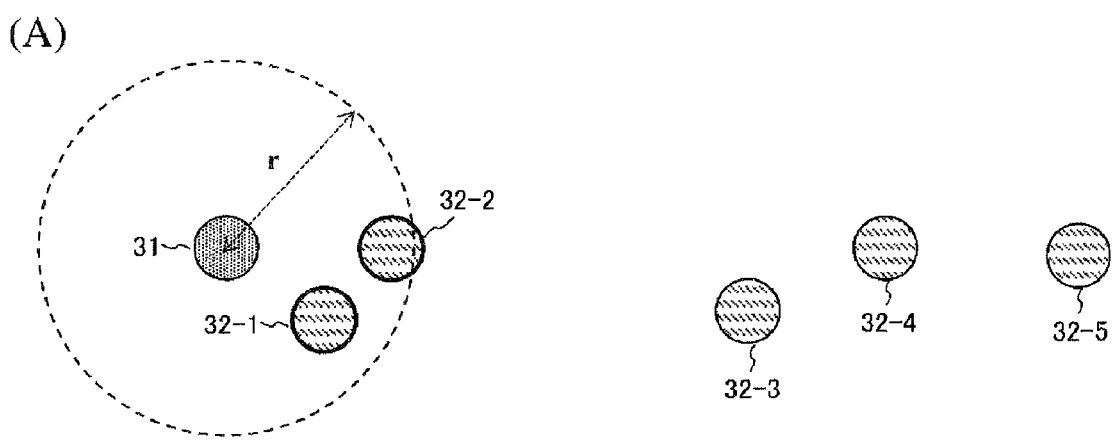
(B)
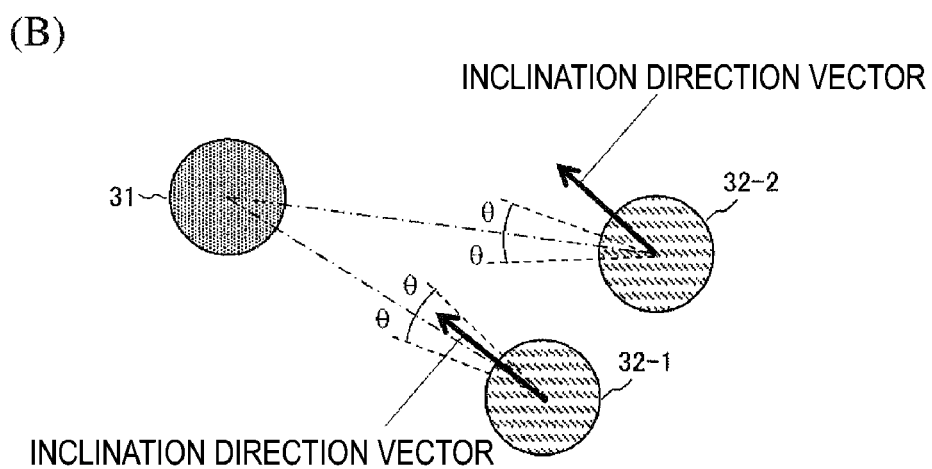

INFORMATION PROCESSING EQUIPMENT, INFORMATION PROCESSING METHODS, AND PROGRAMS

CROSS-REFERENCE TO RELATED APPLICATIONS

This application is a 371 U.S. National Phase of International Application No. PCT/JP2019/033266, filed on Aug. 26, 2019. The entire disclosure of the above application is incorporated herein by reference.

TECHNICAL FIELD

The present disclosure relates to a technique for determining and grasping owner information about an electrical communication facility.

BACKGROUND ART

In order to manage an electrical communication facility, there is a technique for generating a solid model of an electrical communication facility from point group data acquired by a mobile mapping system (MMS) (for example, see NPL 1) to acquire a position coordinate and deterioration status (inclination or flexibility) of the facility and facility information about cables, posts, branch lines, and other line strips (for example, see NPL 2, PTL 1, PTL 2). FIG. 1 is a view illustrating a technique for generating the solid model of the electric communication facility from the point group data acquired by the mobile mapping system (MMS) (for example, see NPL 1) to acquire the position coordinate and the deterioration status (inclination or flexibility) of the facility and the facility information about cables, posts, branch lines, and other line strips.

CITATION LIST

Patent Literature

PTL 1: JP 2019-52959 A
PTL 2: JP 2018-195240 A

Non Patent Literature

NPL 1: Mobile Mapping System (MMS), http://www.what-mms.com/(Search on Aug. 2, 2019)
NPL 2: Matsumoto et al., "Study on Method for Identifying Inspection Target Equipment" (B-13-24), 2018 Communication Society of the Institute of Electronics, Information and Communication Engineers

SUMMARY OF THE INVENTION

Technical Problem

FIG. 1 is a view illustrating a management server system 1 that associates measured facility information with a content registered in a facility information database. The management server system 1 can acquire the owner information about the facility in addition to the facility information. The management server system 1 will be described using FIGS. 1 to 8.

In FIGS. 1 to 8, using a measurement apparatus such as the mobile mapping system (MMS), measurement data including three-dimensional point group data including a utility pole that is a columnar structure (hereinafter, referred to as "solid data"), raw image data, and the like are input to a data analysis unit 10 directly by some recording medium or through a network (not illustrated) including the Internet.

In the data analysis unit 10, the image data in the measurement data is sent to an image conversion unit 11, while the point group data in the measurement data is sent to a facility information acquisition unit 12.

The image conversion unit 11 converts raw data that are the sent raw image data into Joint Photographic Experts Group (JPEG) data that are irreversible compressed image data, and sends the data to an operation terminal device 21 (described later) outside the data analysis unit 10.

The facility information acquisition unit 12 reads the three-dimensional point group data from the measurement data and information around the location region from a two-dimensional facility database 20, and outputs the three-dimensional point group data and the information to a model extraction unit 13.

The model extraction unit 13 extracts a cable or the like including the columnar structure and the branch line that appears to be the utility pole from the three-dimensional point group data constituting the solid data based on the facility information read through the facility information acquisition unit 12, couples, interpolates, and modified center points of horizontal cross sections for each columnar structure to generate data of the center axis, and outputs these processing results to a facility state determination unit 14.

The facility state determination unit 14 quantitatively calculates deflection, inclination, and the like of each columnar structure extracted by the model extraction unit 13, and outputs the processing result to an automated matching unit 15.

The automated matching unit 15 refers to the facility information read from the facility database 20 with respect to the data of each columnar structure extracted by the model extraction unit 13, and sequentially matches an identifier, namely, a utility pole name as identification information about utility pole from positional information and a feature as the structure, and outputs the matching result to a manual modification unit 16. The automated matching unit 15 can output the owner along with the utility pole name because the owner of the columnar structure is also registered in the facility information of the facility database 20.

All columnar structures including the columnar structures that were not capable of automatically matching by the automated matching unit 15, identification information about the automatically matched utility pole, and the JPEG image data sent from the image conversion unit 11 are displayed in the operation terminal device 21 operated by an operator. In the manual modification unit 16, the operator operates the terminal device while referring to various data, and appropriately modifies the identification information about the automatically matched utility pole.

In the measurement result diagnostic unit 17, the utility pole name of each columnar structure, the facility state measurement result, the image data sent from the image conversion unit 11, the positional information about each columnar structure, and the like can be referred to.

FIG. 2 is a flow chart illustrating a processing contents performed mainly by the automated matching unit 15. In FIG. 2, in the automated matching unit 15, one utility pole to be matched is selected from the facility information read from the facility database 20 based on the solid data of the columnar structure input through the facility information acquisition unit 12 and the model extraction unit 13 (step S101).

The automated matching unit 15 determines whether complete matching processing is completed depending on whether the unmatched utility poles can be elected (step S102).

When determining that the unmatched utility pole can be selected and the matching processing is not yet finished (Yes in step S102), the automated matching unit 15 collects the solid data of the columnar structure having the positional information within a first specified distance, for example, 10 [m] with respect to a coordinate position of the selected utility pole, and selects a utility pole model candidate that becomes a matching target of the utility pole (step S103).

FIG. 3 is a view illustrating a case in which solid data [pole1] to [pole4] of the columnar structure having the positional information within a certain radius, for example 10 [m], from the position coordinate of the [utility pole X] selected from the facility database 20 are selected as the utility pole model candidate.

Based on the data of a center axis produced mainly by the model extraction unit 13 described in the previous paragraph, the solid data that is the selected model candidate corresponding to at least one of:
(1) the inclination of the center axis is inclined greater than or equal to an effective range from a vertical direction,
(2) a column length (a length of the center axis) is out of the effective range, and
(3) an inclination angle (taper angle) of a circumference surface along the center axis deviates from the taper angle range of the utility pole standard beyond the angle that becomes the margin, is excluded from the model candidate, considering that possibility of the utility pole is markedly low (step S104).

Specific numerical values of the various parameters used for each of the conditions can be easily changed by a program.

Then, the automated matching unit 15 calculates a radius of the selected utility pole at a predetermined plurality of height positions from a ground, for example, 2 [m], 3 [m], 4 [m] based on the facility data (step S105).

At this point, for a predetermined plurality of height positions of the utility poles, for example, radii at 2 [m], 3 [m], 4 [m], after the taper angle of the utility pole is determined by the equation of "(bottom end diameter−tip end diameter)/height" based on the data associated with a utility pole X [utility pole length, tip end diameter, bottom end diameter], the radii at the heights 2 [m] 3 [m], 4 [m] are determined by the equation of "bottom end diameter−H (height)×taper angle" using the calculated taper angle.

Furthermore, the automated matching unit 15 calculates the radius from the ground surface at a predetermined plurality of height positions, for example, 2 [m], 3 [m], 4 [m], for each of the solid data of each of the columnar structures remaining after the excluding processing that becomes the model candidate, the columnar structures corresponding to the utility pole (step S106). In calculating the radius, a value from a center axis position produced by the model extraction unit 13 to an outer diameter position of the three-dimensional point group data is acquired at each height position.

A root mean square (RMS) value of the radius at a predetermined plurality of height positions of the utility poles calculated in step S105 and the radius at a predetermined plurality of height positions of each solid data that becomes the model candidate calculated in step S106 is acquired (step S107).

The automated matching unit 15 sets the solid data of the utility pole model in which the required RMS value is the smallest and the utility pole model within the specified range from the RMS value, for example, within 10 [mm] to the matching target candidate as long as the solid data and the utility pole model are possibly a correct matching target model. The matching processing for setting an identifier of the utility pole X, namely, the name of the utility pole to the utility pole model having the least error of the positional information from among the candidates (step S108).

Then, the automated matching unit 15 returns to the processing from step S101 in order to perform the similar processing on the next utility pole.

In this way, the processing in steps S101 to S108 are repeated for a number of few minutes of utility poles read from the facility database 20, and the matching processing is completed.

Furthermore, when the processing for selecting the utility poles of the matching target is performed in step S101, it is not possible to select the unmatched utility pole in step S102. When the complete matching processing is determined to be ended (No in step S102), the automated matching unit 15 calculates an average and variance of the distances between the positions of all the utility poles matched at that time and the matched solid model again, and calculates a threshold for the matching processing, for example, [average value+1σ] (step S109).

FIG. 4 is a view illustrating an already-matched [utility pole X] and solid data [Pole01] of the utility pole model, and [utility pole Y] and a solid data [Pole02] of the utility pole model along with an arrow that is the distance between the respective positions.

As described above, the threshold [average value+1σ] is set as the threshold that a criterion determining whether to perform the re-projection by calculating the average and a variance value σ from the distances of the matched combinations, whereby the matching result having the distance greater than the threshold is released to set to re-matching target.

At this point, the name of the utility pole in which the distance between the positions of the utility pole and the solid model exceeding the threshold in the matching result is selected for the target of performing the re-matching processing (step S110). In other words, the relationship between the name of the utility pole that becomes the processing target of re-matching and the solid data of the columnar structure that is already matched is released.

In addition, in the case where the utility pole name near the solid data in which the matching is released is already matched with another solid data, it becomes the re-matching target. This is because the released solid model may be a correct matching destination of the utility pole name near the released solid model.

In the case where solid data of the columnar structure exists, for example, near the radius 10 [m] in the unmatched utility pole name, it also becomes the re-matching target.

Then, the automated matching unit 15 determines the order of the re-matching for each of the utility pole names that are set to the target of the re-matching (step S111).

At this point, the automated matching unit 15 acquires and stores the utility pole name near each of the utility pole names of the re-matching, for example, within a radius of 30 [m] or the utility pole name already matched with the solid data in other utility pole names connected by the cable.

Then, the automated matching unit 15 acquires a standard deviation based on the difference between the position coordinate stored in the facility database 20 and the position coordinate of the already-matched solid data for the near utility pole name.

Then, in order to preferentially process a set of utility pole names from the lower standard deviation, the automated matching unit 15 sorts the set of utility pole names that becomes the re-matching processing in ascending order of the standard deviation.

FIG. 5 illustrates a process in which, for each of the utility poles $P_0$ (P1, P2, . . . ), the utility pole matched with the nearby solid data is acquired and stored, and the standard deviation is acquired based on the difference between the matched solid data and the position coordinate stored in the facility database 20.

That is, the standard deviation of the distance from the solid data located within the predetermined range is sequentially calculated such that a standard deviation $\sigma_1$ from a distance 1, a distance 2, a distance 3, . . . between a utility pole $P_1$ on the left of FIG. 5 and the nearby solid data already matched is calculated, and such that a standard deviation $\sigma_2$ from a distance 1', a distance 2', a distance 3', . . . between a utility pole $P_2$ on the left of FIG. 5 and the nearby solid data already matched is calculated.

The automated matching unit 15 produces the set of utility pole names that become the target of the re-matching processing, and determining the sorting of the standard deviation in ascending order.

Then, the automated matching unit 15 calculates values of parallel translation, rotation, and a scale as a conversion parameter that performs coordinate conversion of the position coordinate of the utility pole name into the position coordinate of the solid data based on the position coordinate of the utility pole name Px on the facility database 20 and the position coordinate of each solid data as a group of utility pole name and solid data near an already-produced name $P_0$ as a set $\{P_A\}$ with respect to the utility pole name that becomes the re-matching target as pretreatment of the re-matching (step S112).

Furthermore, the automated matching unit 15 converts the coordinate of the utility pole name $P_0$ using the conversion parameter, and sets the coordinate of the solid data to $P_0'$.

FIG. 6(A) illustrates Set $[P_A]=\{$(utility pole 1, pole1), (utility pole 2, pole2), (utility pole 3, pole3), (utility pole 4, pole4), (utility pole 5, pole5).

The automated matching unit 15 makes conversion based on a conversion parameter in which the coordinate of the utility poles $P_1$ is calculated from the relationship between the utility poles 1 to 5 and the solid data pole1 to pole5, and calculates an estimated position poleP1' of the solid data that becomes the utility pole model of the utility pole $P_1$ as illustrated in FIG. 6(B). In this case, it is assumed that the utility pole name near the utility pole $P_1$, for example, within a radius of 30 [m] or connected by the cable is set to the target, and that Helmart transform is used as similarity transform.

The automated matching unit 15 acquires a set $\{P_B\}$ of solid data in the vicinity of the target utility pole name $P_0$, for example, within the radius of 10 [m] that becomes the unmatched utility pole model.

However, the solid data is excluded from the utility pole of the matching target because of the extremely high possibility that the solid data is not the utility pole of the matching target when at least one of the following conditions is satisfied:

(1) in the case where the utility pole specification is set and the height of the ground surface portion of the solid data is less than a half of ⅚ of the column length of the set utility pole specification, (2) in the case where the utility pole specification is set and a predetermined plurality of height positions, for example, the RMS acquired from the radius difference at 2 [m], 3 [m], and 4 [m] falls within a specified range, for example, 50 [mm] or more, and (3) in the case where the utility pole specification is not set and the solid data is clearly not the utility pole.

FIG. 7 is a view illustrating a relationship between [utility pole $P_1$] and a set $\{P_B\}=\{$pole1, pole2, pole3$\}$ of solid data pole1, pole2, pole3 that becomes the utility pole model.

In order to determine the closest utility pole, the automated matching unit 15 determines the distance between $P_B$ and $P_0$ from the positional relationship of the utility pole name with respect to each of the solid data that becomes the utility pole model.

Then, with respect to an element of $P_B$ having the lowest value among the required distances, the utility pole name registered with the facility database 20 is associated with the solid data (step S113).

Because the order of other re-matching processing is possibly changed because the matched solid data is increased by the re-matching, as described above, after the standard deviation of the "near utility pole name" associated with the utility pole name $P_0$ is acquired based on the difference between the position coordinate stored in the facility database 20 and the position coordinate of the already-matched solid data, the set of utility pole names that become the target of the re-matching processing is sorted in ascending order of the standard deviation, thereby updating the processing order.

FIG. 8 is a view illustrating the relationship between [utility pole $P_1$] and solid data pole1, pole2, pole3 that become the utility pole models as the matching target. When the position coordinate converted by the conversion parameter with respect to [utility pole P1] is set to PC, the re-matching is performed by minimizing the distance from the solid data pole1.

When the re-matching of the solid data is finished with respect to all of the utility pole names by repeatedly performing in the sequence re-matching, the automated matching unit 15 ends the processing in FIG. 2. In this way, the owner information of the facility can be acquired by comparing the generated solid model to the facility database.

However, while the management server system 1 in FIG. 1 can specify the owner of the facility such as the utility pole, the management server system 1 cannot determine the owner of the branch line or the post attached to the facility, and has the problem in that it takes time for the investigation. Therefore, an object of the present invention is to provide an information processing apparatus, an information processing method, and a program capable of determining the owner of the attachment attached to the facility using the solid model of the facility extracted from the three-dimensional point group data.

Means for Solving the Problem

In order to achieve the object described above, the information processing apparatus according to the present invention grasps a positional relationship of the columnar structure and the attachment from the solid model, and determines the owner of the attachment from a determination such as an installation standard of the attachment and the positional relationship.

Specifically, an information processing apparatus according to one aspect of the present invention includes an ownership organization classifying unit to which, extracted from three-dimensional point group data, a solid model of a columnar structure and a solid model of an attachment attached to the columnar structure are input, and the ownership organization classifying unit configured to grasp a positional relationship between the columnar structure and the attachment from the solid models and determine an owner of the attachment from the positional relationship.

An information processing method according to another aspect of the present invention includes:
acquiring, extracted from three-dimensional point group data, a solid model of a columnar structure and a solid model of an attachment attached to the columnar structure;
grasping a positional relationship of the columnar structure and the attachment from the solid models; and
determining an owner of the attachment from the positional relationship.

A first determination technique is as follows. The ownership organization classifying unit includes:
a coordinate acquisition unit configured to acquire coordinates of the columnar structure and the attachment at a slice plane when the solid model is sliced at a predetermined height from a ground boundary; and
a distance determination unit configured to calculate a distance between the columnar structure and the attachment at the slice plane from the coordinates, when the distance is shorter relative to a threshold, determine the owner of the attachment as a communication company, and when the distance is longer relative to the threshold, determine the owner of the attachment as an electric power company.

The first determination determines the owner of the attachment from a planar positional relationship between the solid model of a columnar structure and the solid model of the attachment in the solid model. For example, a distance between a utility pole and a center of a point (a center of a ground boundary) at which a branch line or a post reaches a ground is acquired, and whether the branch line or the post is owned by a communication company or an electric power company is determined based on whether the distance exists in a constant threshold determined by the communication company or the electric power company. That is, regardless of the owner of the columnar structure, when the distance is shorter than the threshold, the owner of the attachment is determined to be a "communication company", and when the distance is longer than the threshold, the owner of the attachment is determined to be an "electric power company".

A second determination technique is as follows. The ownership organization classifying unit includes:
a reference axis acquisition unit configured to acquire reference axes of the columnar structure and the attachment from the solid model; and
a height determination unit configured to detect a closest point between the reference axis of the columnar structure and the reference axis of the attachment, and determine, when the two closest points exist, the owner of the attachment forming the closest point having a higher altitude as the electric power company, and the owner of the attachment forming the closest point having a lower altitude as the communication company.

The second determination technique determines the owner of the attachment from the attaching height of the solid model of the attachment to the solid model of the columnar structure. For example, when a reference axis is acquired between post models and branch line models to make the reference axis closest to a reference axis of a utility pole model, the communication company or electric power company is determined due to a height relationship of the closest location. That is, regardless of the owner of the columnar structure, the owner of the attachment that forms the closest point at the higher altitude is determined to be the electric power company and the owner of the attachment that forms the lower closest point is determined to be the communication company.

A third determination technique is as follows.
A coordinate of one specific point of a cable spanning the columnar structure is further input to the ownership organization classifying unit, the one specific point existing within a predetermined distance from the columnar structure, and
the ownership organization classifying unit includes a height and distance determination unit configured to, when the height of the top of the attachment is acquired:
determine, when the height of a top of the attachment is acquired exists within a predetermined range around a height of the specific point, that the owner of the attachment is identical to the owner of the cable,
determine, when the height of the top of the attachment is lower than the height of the specific point and outside the predetermined range, that the owner of the attachment is a communication company, and
determine, when the height of the top of the attachment is higher than the height of the specific point and outside the predetermined range, that the owner of the attachment is an electric power company.

The third determination technique determines the owner of the attachment using the difference between the coordinate of known one point existing within a fixed distance from the solid model of the columnar structure and the height of the solid model of the attachment relative to the coordinate of the one point. For example, as the coordinate of the known one point, when a cable of one owner exists, and when the height of the solid model of the attachment exists within a predetermined range of a cable attachment location, the owner of the attachment is determined to be the same as the cable. That is, when the top of the post or the branch line is clearly low based on the cable of the communication company, the owner of the post or the branch line is determined to be the communication company. On the other hand, when the top of the post or the branch line is clearly high based on the cable of the electric power company, the owner of the post or the branch line is determined to be the electric power company.

A fourth determination technique is as follows. The ownership organization classifying unit includes a feature height determination unit configured to:
when a feature in which a standard exists in a height from a ground boundary is being attached to the columnar structure,
acquire a difference between a height of a top of the attachment and a height of a feature, and determine that the owner of the attachment is identical to the owner of the columnar structure when the difference falls within a threshold determined by the feature.

The fourth determination technique determines the owner of the attachment using the difference between the coordinate of known one point existing within a fixed distance from the solid model of the columnar structure and the height of the solid model of the attachment relative to the coordinate of the one point. The fourth determination technique uses the feature (number ticket, ground, face, nameplate, tip end) in which the standard exists in the height of the columnar structure from the ground boundary as the known coordinate of the one point. The owner of the attachment is determined by comparing the height of the feature to the attaching height of the attachment.

The information processing apparatus in one aspect of the present invention further includes an attachment determination unit to which a solid model of a structure extracted as other than the columnar structure from the three-dimensional point group data is input, the attachment determination unit configured to calculate an inclination of the solid model and determine that the structure is the attachment based on the inclination. The attachment determination unit determines the model of the columnar structure or the model of the attachment among the solid models.

Still another aspect of the present invention is a program causing a computer to function as the information processing apparatus. The apparatus according to the present invention can also be implemented by a computer and a program. The program can be recorded in a recording medium and provided through a network.

Note that each of the inventions described above can be combined with each other to the extent possible.

Effects of the Invention

The present invention can provide information processing apparatus, information processing methods, and programs, which are capable of determining the owner of the attachment attached to the facility using the solid model of the facility extracted from the three-dimensional point group data.

According to the present invention, in design work of an external facility (electric communication facility), the owner of the branch line or the post can be determined from the external facility model acquired from the point group data, so that the advantageous effect of efficiency of the design work is achieved.

BRIEF DESCRIPTION OF DRAWINGS

FIG. 20 is a table illustrating a determination criterion included in the information processing apparatus of the fourth embodiment.

FIG. 28 is a view illustrating the operation of the attachment determination unit included in the information processing apparatus of the seventh embodiment.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 9:
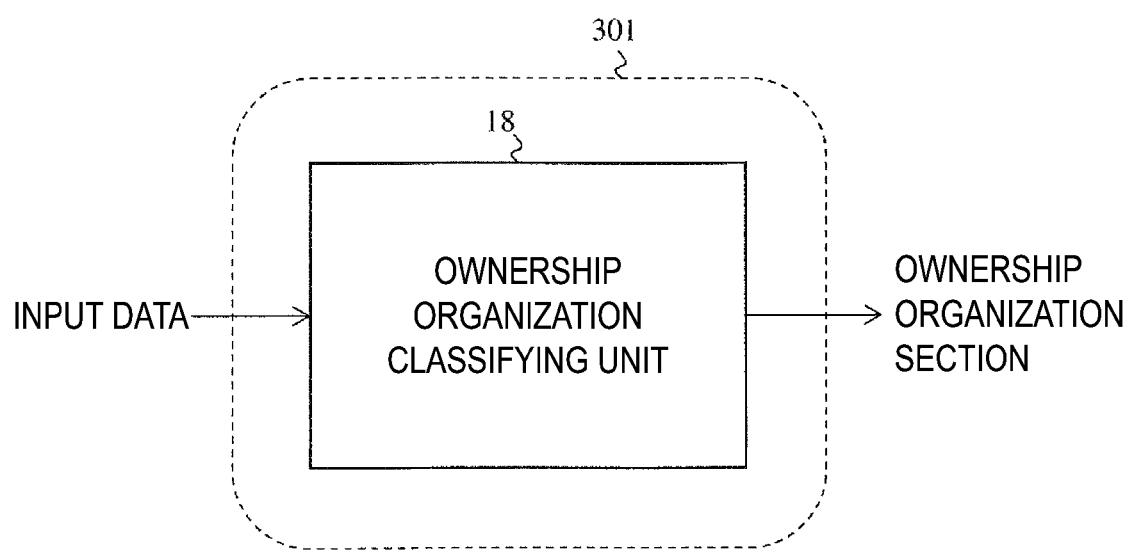
FIG. 9 is a block diagram illustrating a configuration of a functional circuit of an information processing apparatus according to a first embodiment.

FIG. 9 is a view illustrating an information processing apparatus 301 according to a first embodiment. The information processing apparatus 301 includes an ownership organization classifying unit 18 to which, extracted from three-dimensional point group data, a solid model of a columnar structure and a solid model of an attachment attached to the columnar structure are input, and the ownership organization classifying unit configured to grasp a positional relationship between the columnar structure and the attachment from the solid models and determine an owner of the attachment from the positional relationship.

Figure 1:
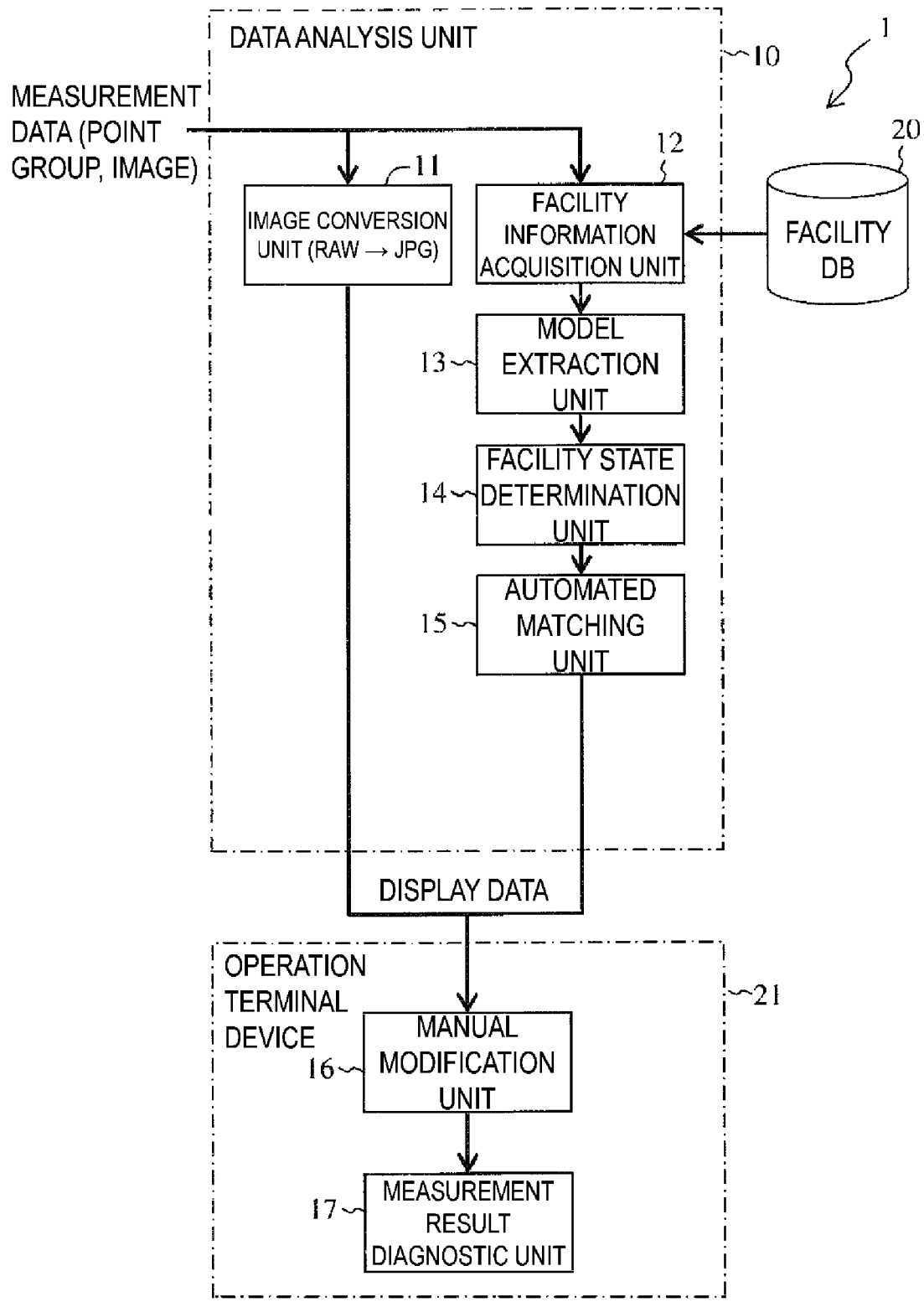
FIG. 1 is a block diagram illustrating a configuration of a functional circuit in a management server system related to the present invention.
Figure 2:
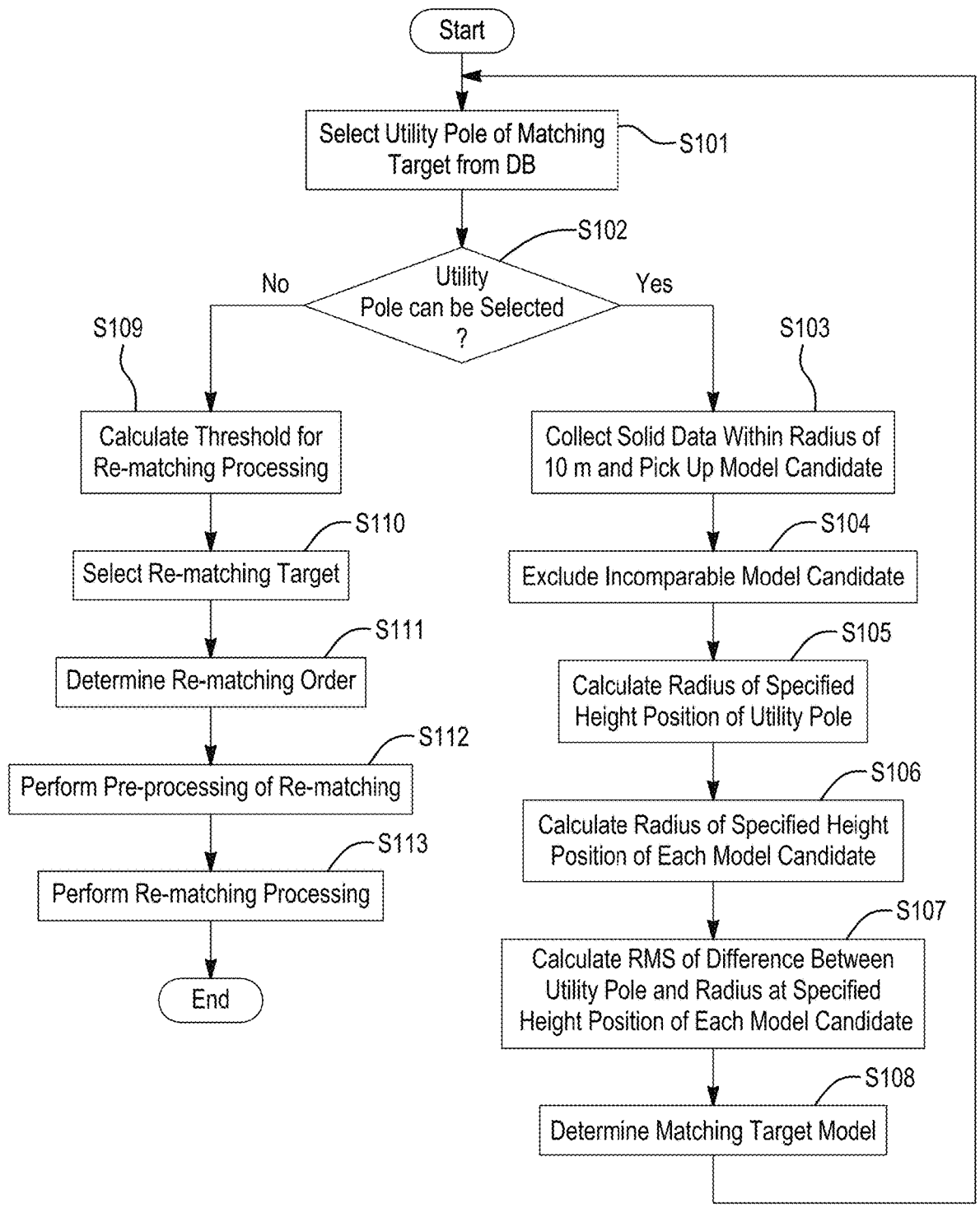
FIG. 2 is a flowchart illustrating processing content performed on an automated matching unit in the management server system related to the present invention.
Figure 3:
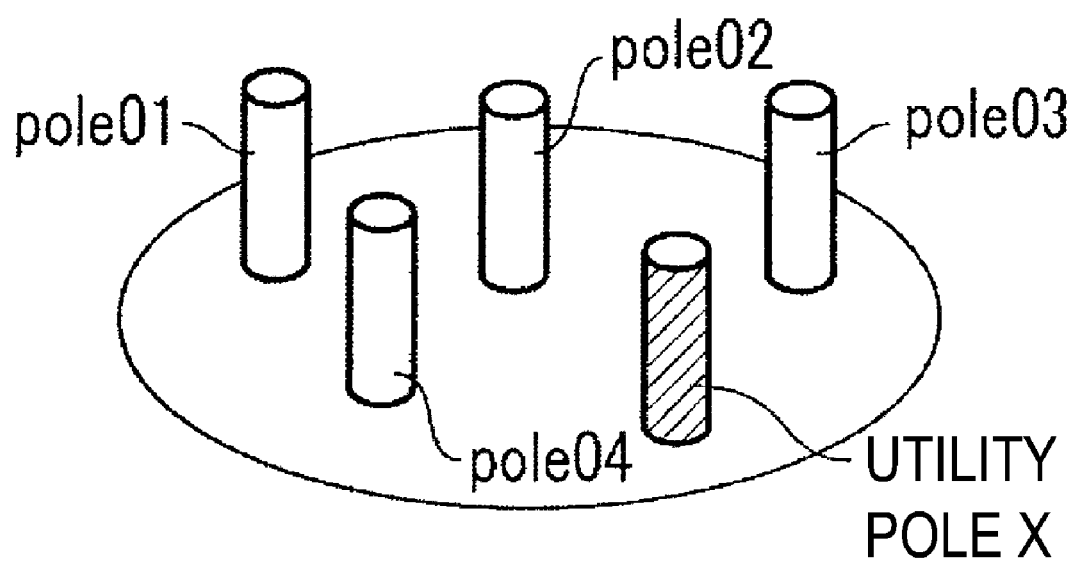
FIG. 3 is a view illustrating operation of the management server system related to the present invention.
Figure 4:
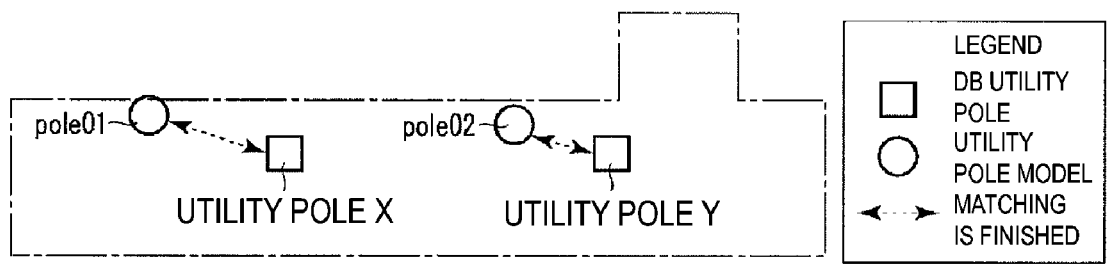
FIG. 4 is a view illustrating the operation of the management server system related to the present invention.
Figure 5:
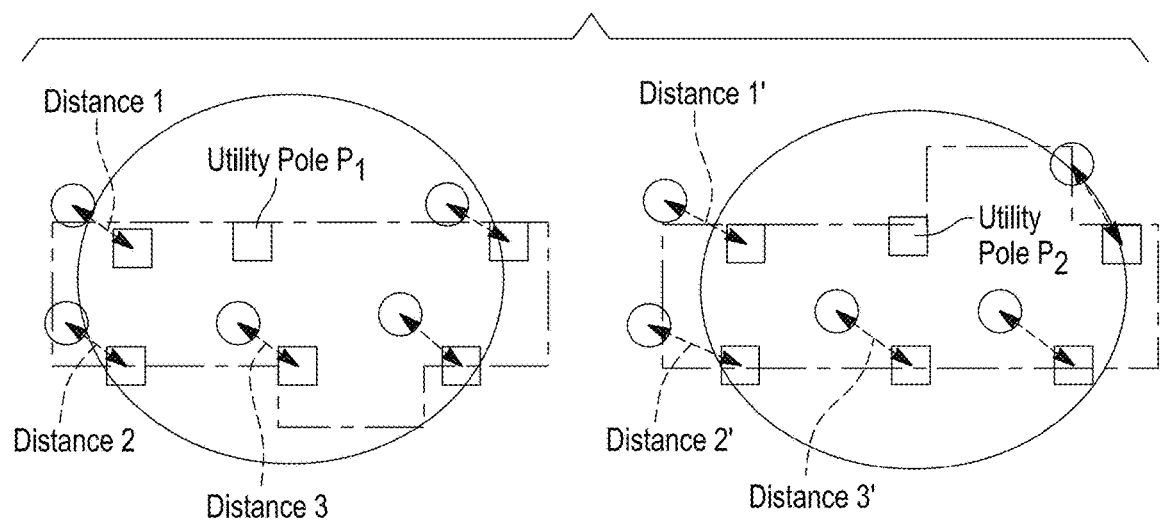
FIG. 5 is a view illustrating the operation of the management server system related to the present invention.
Figure 6:
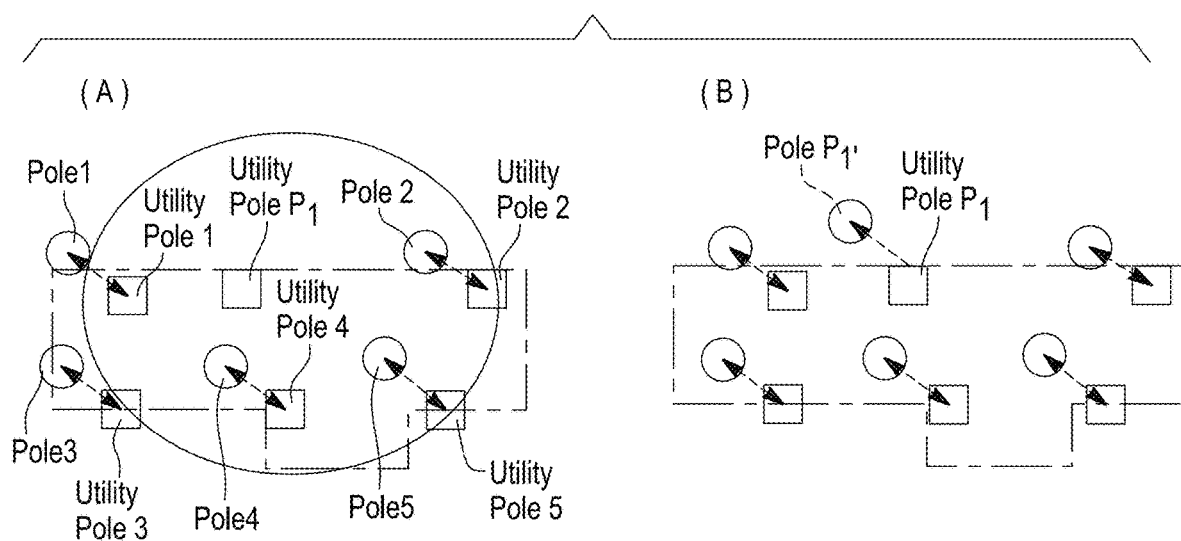
FIG. 6 is a view illustrating the operation of the management server system related to the present invention.
Figure 7:
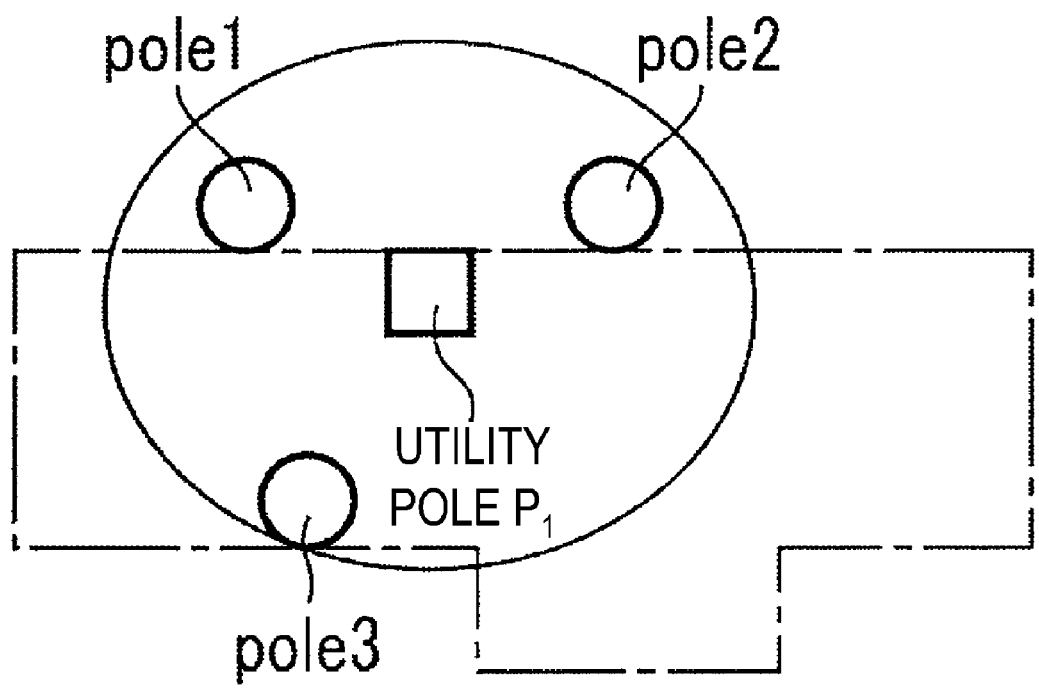
FIG. 7 is a view illustrating the operation of the management server system related to the present invention.
Figure 8:
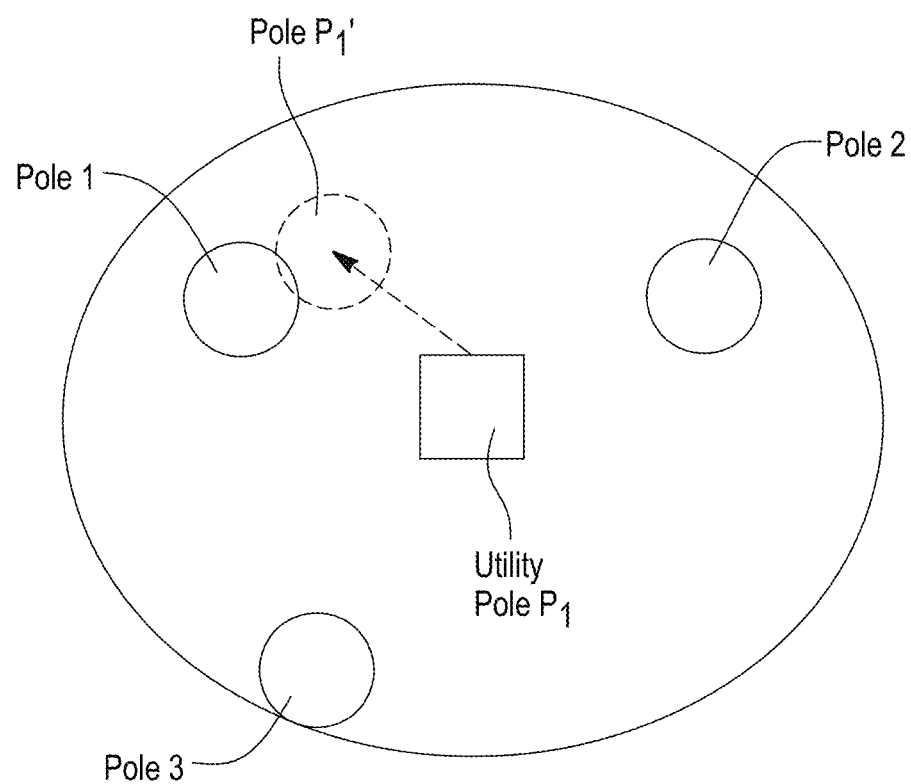
FIG. 8 is a view illustrating the operation of the management server system related to the present invention.
Figure 10:
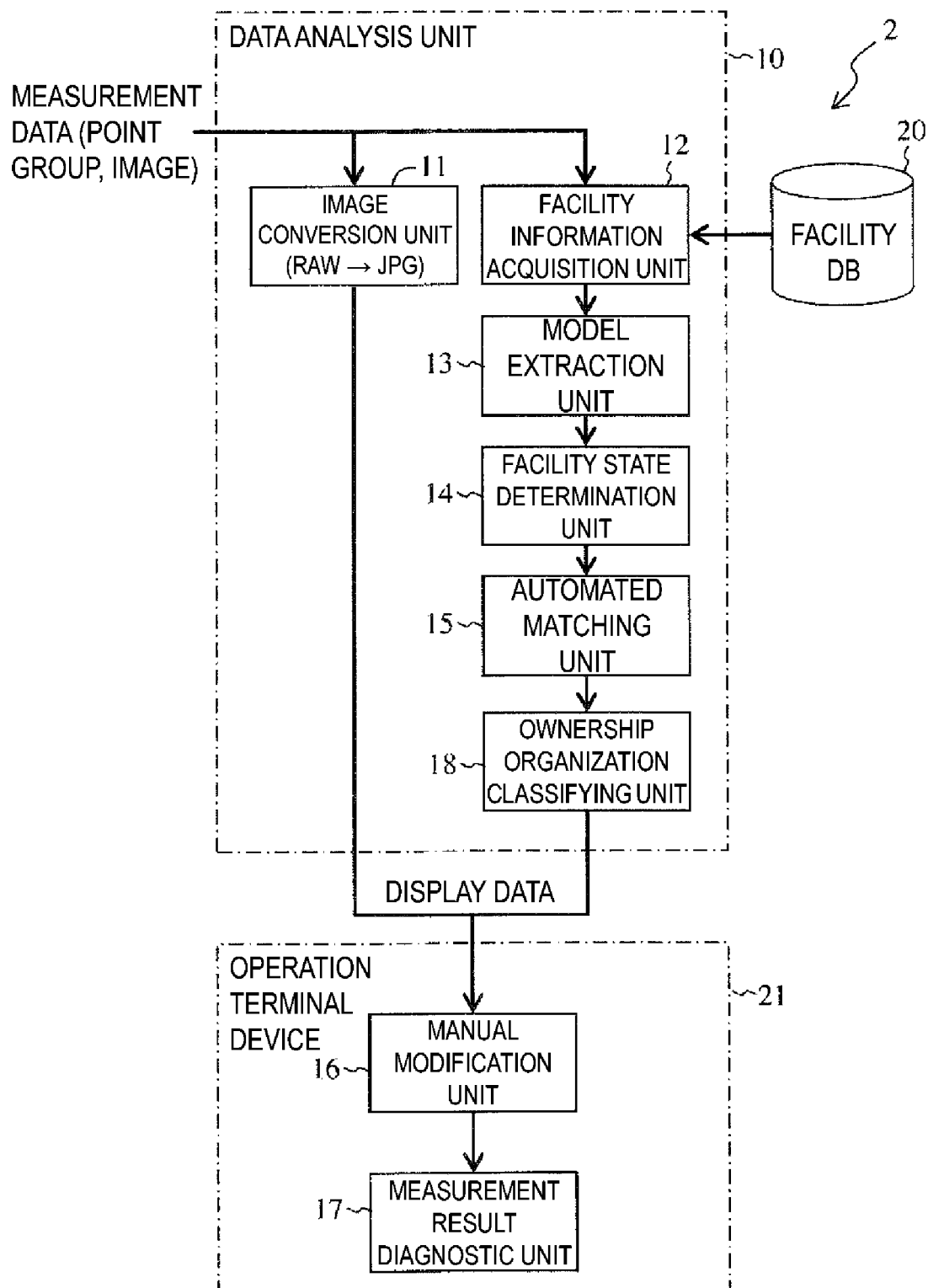
FIG. 10 is a view illustrating a system including the information processing apparatus of the first embodiment.

Specifically, the information processing apparatus 301 may be a management server system in FIG. 1. FIG. 10 is a view illustrating the case where the information processing apparatus 301 is the management server system. In a management server system 2, the ownership organization classifying unit 18 is disposed at a rear stage of the automated matching unit 15, and input data is input from the automated matching unit 15 to the ownership organization classifying unit 18. The input data is the solid model of the columnar structure, the solid model of the attachment, and the owner of the columnar structure. These solid models are generated by the model extraction unit 13, and the columnar structure of the solid models is selected by the automated matching unit 15 (see FIG. 2). On the other hand, in the solid models, the attachment is selected by a technique described below.

The ownership organization classifying unit 18 grasps the positional relationship between the columnar structure and the attachment from the input solid model, determines the owner of the attachment from a decision such as an installation standard of the attachment, the positional relationship, and the owner information about the columnar structure. The ownership organization classifying unit 18 can determine the owner of the attachment by, for example, (determination technique 1): determination using the planar positional relationship between solid models,
(determination technique 2) determination in consideration of an attaching height of the solid model of the attachment, and
(determination technique 3) determination using the relationship between a coordinate of one known point existing in a fixed distance from the solid model of the columnar structure and the attaching height of the solid model of the attachment to the coordinate.

Thus, the information processing apparatus 301 can determine the owner of the attachment with no use of a facility DB 20.

Second Embodiment

Figure 11:
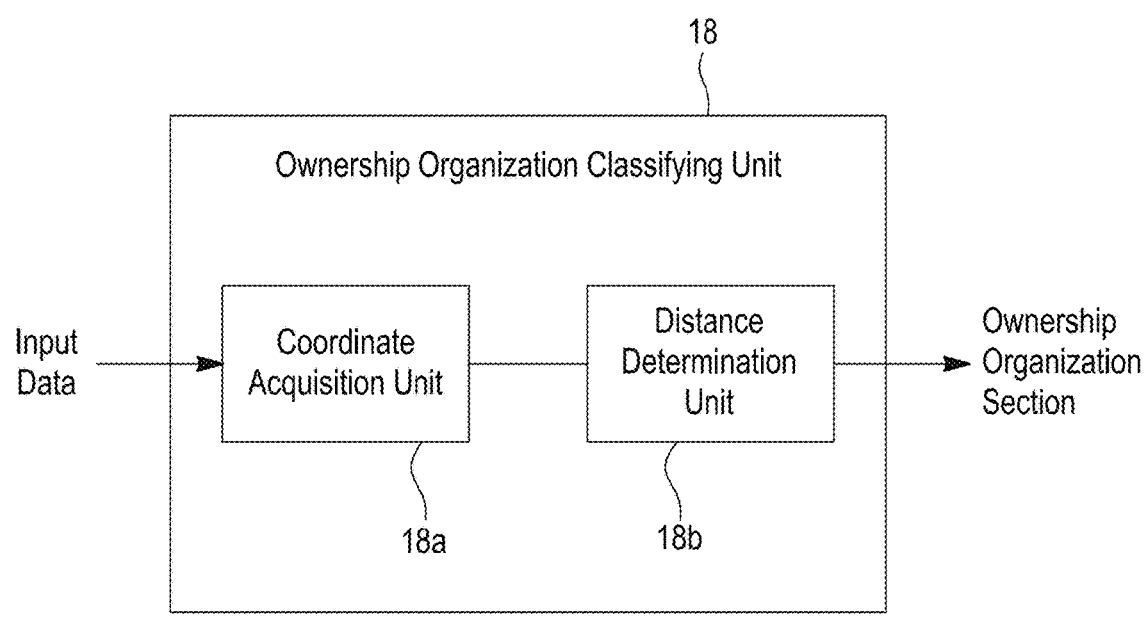
FIG. 11 is a view illustrating an ownership organization classifying unit included in an information processing apparatus according to a second embodiment.

In a second embodiment, the determination technique 1 will be described. FIG. 11 is a view illustrating the ownership organization classifying unit 18 of the second embodiment. The ownership organization classifying unit 18 includes:
a coordinate acquisition unit 18a that acquires coordinates of the columnar structure and the attachment at a slice plane when the solid model is sliced at a predetermined height from the ground boundary; and
a distance determination unit 18b that calculates a distance between the columnar structure and the attachment at the slice plane from the coordinates, and compares the threshold to the distance to determine an owner.

The input data of the second embodiment is the solid model of the columnar structure and the solid model of the attachment.

Figure 12:
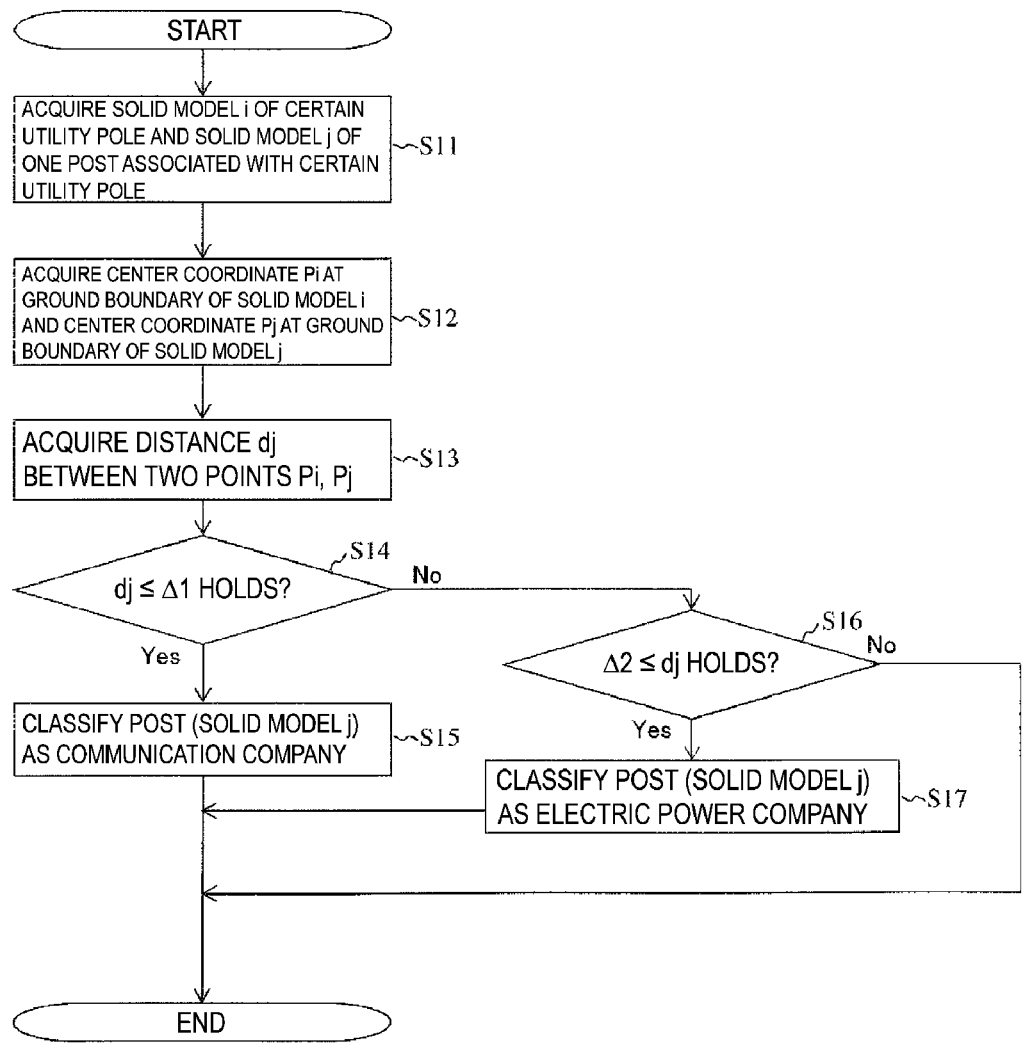
FIG. 12 is a flowchart illustrating operation of the ownership organization classifying unit included in the information processing apparatus of the second embodiment.

FIG. 12 is a flowchart illustrating the operation of the ownership organization classifying unit 18 of the second embodiment.

Figure 13:
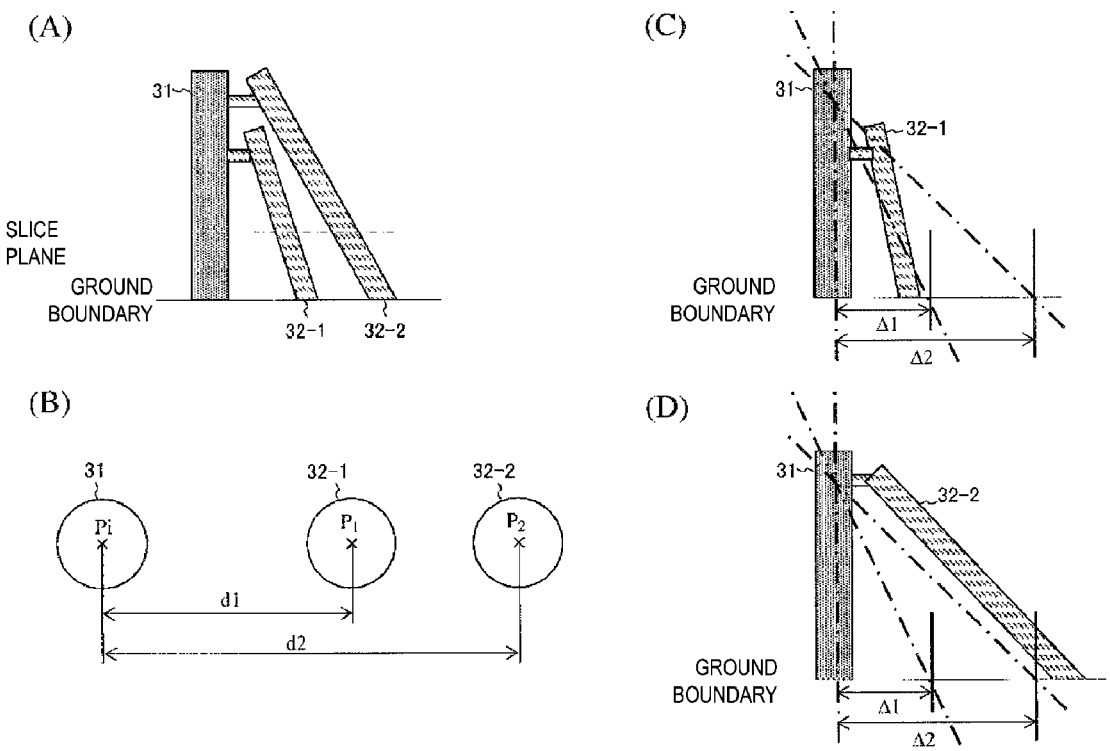
FIG. 13 is a view illustrating the operation of an ownership organization classifying unit included in an information processing apparatus of the second embodiment.

FIG. 13 is a view illustrating the operation of the coordinate acquisition unit 18a. The coordinate acquisition unit 18a acquires the coordinates of the columnar structure and the attachment at the slice plane when the solid model is sliced from the ground boundary to a predetermined height (may be the case of the ground boundary). In the second embodiment, an example in which the columnar structure is a utility pole and an attachment is a post or a branch line will be described. As illustrated in FIG. 13(A), a post 32-1 and a post 32-2 are attached to a utility pole 31. The slice plane is a plane parallel to the ground. The height of the slice plane may be any height greater than or equal to the ground boundary or less than the height of the tip end of the post 32-1. The number of posts is one or more, and the utility pole without the post is outside the determination target of the ownership organization classifying unit 18. The coordinate acquisition unit 18a acquires a solid model of one utility pole 31 and one solid model of the post (post 32-1 or 32-2) associated the utility pole (step S11). For example, the model candidate incompatible in step S104 of FIG. 2 can be set to a solid model of the post.

FIG. 13(B) is a view illustrating sections of the utility pole 31, the post 32-1, and the post 32-2 at the slice plane, and illustrating their outer circumferences and central positions. In the example, a center distance of the solid model is referred to as "the distance between the columnar structure and the attachment". The distance determination unit 18b acquires center coordinates Pi and $P_1$ or $P_2$ from the section of the utility pole 31 at the slice plane and the section of the post 32-1 or the post 32-2 (step S12). Then, a center-to-center distance d1 or d2 is calculated from these center coordinates (step S13). A shortest surface distance of the solid model may be "the distance between the columnar structure and the attachment".

FIGS. 13(C) and 13(D) are views illustrating an owner determination criterion of the attachment performed by the distance determination unit 18b. As illustrated in FIG. 13(C), the distance determination unit 18b determines that the owner of the post 32-1 of which the center is located within a range of Δ1 from the center of the utility pole 31 is a communication company ("Yes" in step S14, step S15). On the other hand, as illustrated in FIG. 13(D), the distance determination unit 18b determines that the owner of the post 32-2 of which the center is located outside a range of Δ2 from the center of the utility pole 31 is an electric power company ("No" in step S14, "Yes" in step S16, step S17) When the center of the post is located in the range of Δ1 to Δ2 from the center of the utility pole 31, the distance determination unit 18b becomes undeterminable ("No" in step S16).

Although the determination is performed by the height of the ground boundary in FIGS. 13(C) and 13(D), the determination may be performed by the slice plane. When "the distance between the columnar structure and the attachment" is calculated on the slice plane, "the distance between the columnar structure and the attachment" at the ground boundary may be estimated from the heights of the attachment portions of the utility pole 31 and the post 32 and the angle of the post, and perform the determine as illustrated in FIGS. 13(C) and 13(D).

In the second embodiment, the attachment is described as the post, but the same applies to the case where the attachment is the branch line.

Third Embodiment

Figure 14:
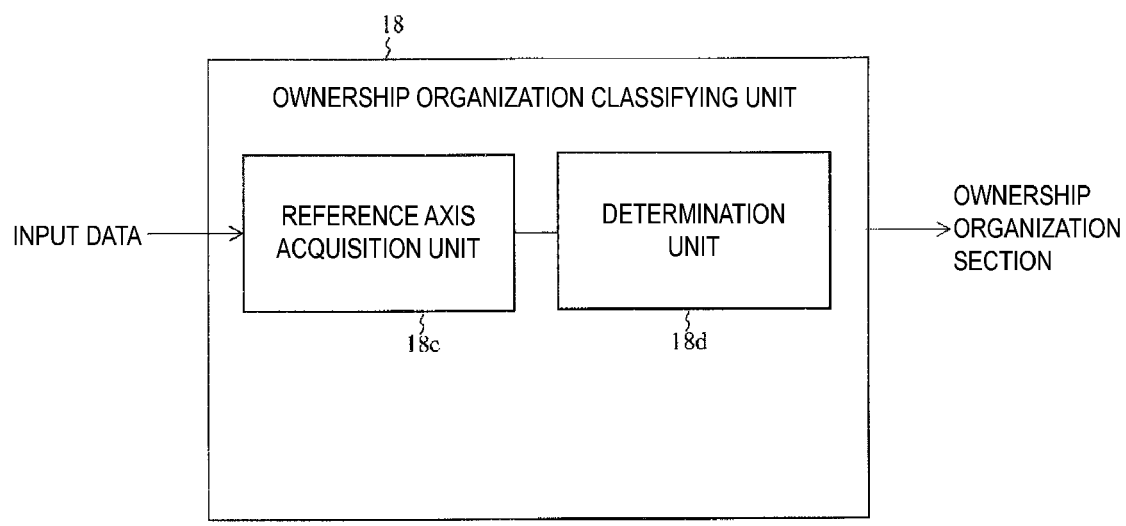
FIG. 14 is a view illustrating the ownership organization classifying unit included in the information processing apparatus according to a third embodiment.

In a third embodiment, the determination technique 2 will be described. FIG. 14 is a view illustrating the ownership organization classifying unit 18 of the third embodiment. The ownership organization classifying unit 18 includes a reference axis acquisition unit 18c and a height determination unit 18d. At this point, the reference axis acquisition unit 18c acquires reference axes of the columnar structure and the attachment from the solid model. The height determination unit 18d detects a closest point between the reference axis of the columnar structure and the reference axis of the attachment, and determines, when two closest points exist, the owner of the attachment that forms the closest point at a higher altitude as the electric power company and the owner of the attachment that forms the closest point at a lower altitude as a communication company.

The input data of the third embodiment is the solid model of the columnar structure and the solid models of two attachments.

Figure 15:
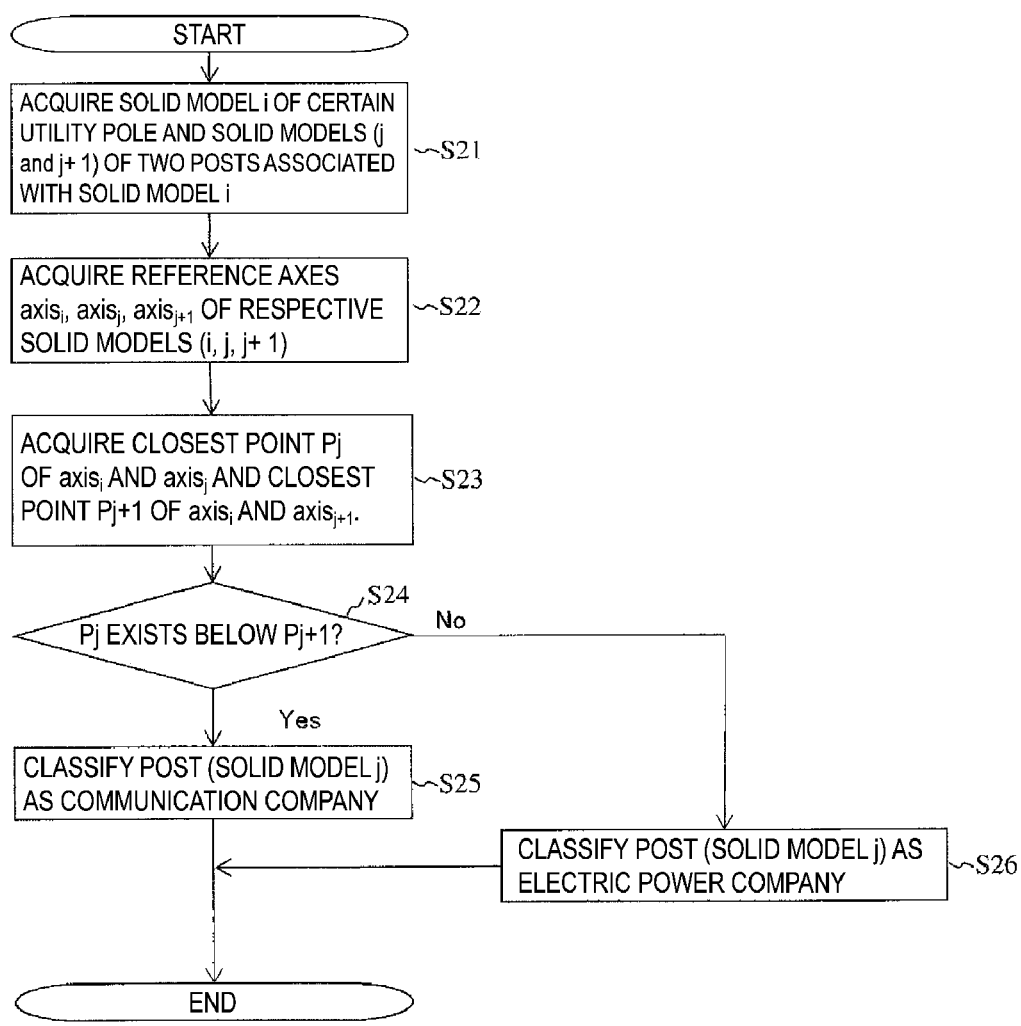
FIG. 15 is a flowchart illustrating the operation of the ownership organization classifying unit included in the information processing apparatus of the third embodiment.

FIG. 15 is a flowchart illustrating the operation of the ownership organization classifying unit 18 of the third embodiment.

Figure 16:
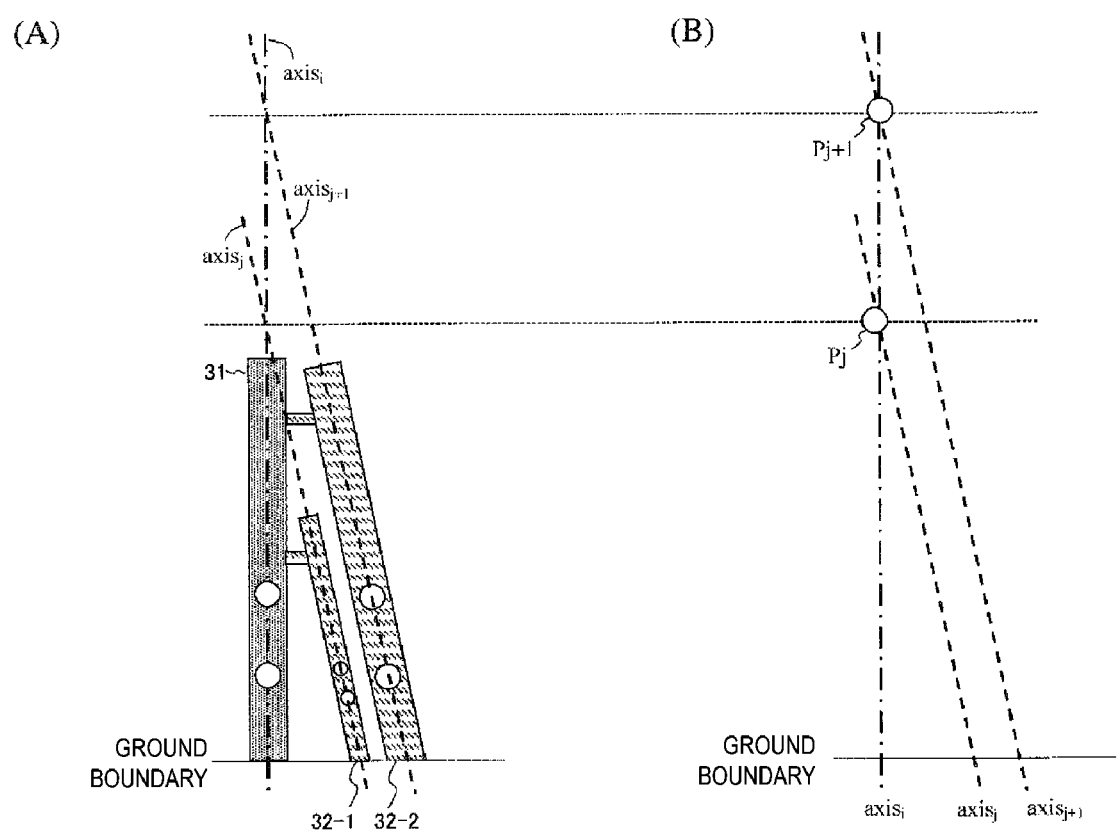
FIG. 16 is a view illustrating the operation of the ownership organization classifying unit included in the information processing apparatus of the third embodiment.

FIG. 16 is a view illustrating the operation of the reference axis acquisition unit 18c. The reference axis acquisition unit 18c acquires a reference axis of the columnar structure and the attachment from the solid model. In the third embodiment, an example in which the columnar structure is a utility pole and an attachment is a post or a branch line will be described. As illustrated in FIG. 16(A), the post 32-1 and the post 32-2 are attached to the utility pole 31. The reference axis acquisition unit 18c acquires the solid model of certain utility pole 31 and the solid models (32-1, 32-2) of the two posts associated with the utility pole 31 (step S21).

The reference axis acquisition unit 18c acquires a line connecting two or more points constituting each solid model as the reference axis for the solid models of the utility pole 31 and the two posts (32-1, 32-2) (step S22). The reference axis of the utility pole 31 is set to $axis_i$, the reference axis of the post 32-1 is $axis_j$, and the reference axis of the post 32-2 is $axis_{j+1}$.

As illustrated in FIG. 16(B), the determination unit 18d acquires a closest point Pj where a reference axis $axis_i$ of the utility pole 31 and a reference axis $axis_j$ of the post 32-1 access closest to each other, and a closest point Pj+1 where a reference axis $axis_i$ of the utility pole 31 and a reference axis $axis_{j+1}$ of the post 32-2 access closest to each other (step S23). Then, the determination unit 18d acquires the heights (z-coordinate) of the two closest points, and compares both heights (step S24). The determination unit 18d determines the post that forms the closest point having the higher z-coordinate as the electric power company, and the post that forms the closest point having the lower z-coordinate as the communication company (steps S25, S26).

In the third embodiment, the attachment is described as the post, but the same applies to the case where the attachment is the branch line.

Fourth Embodiment

Figure 17:
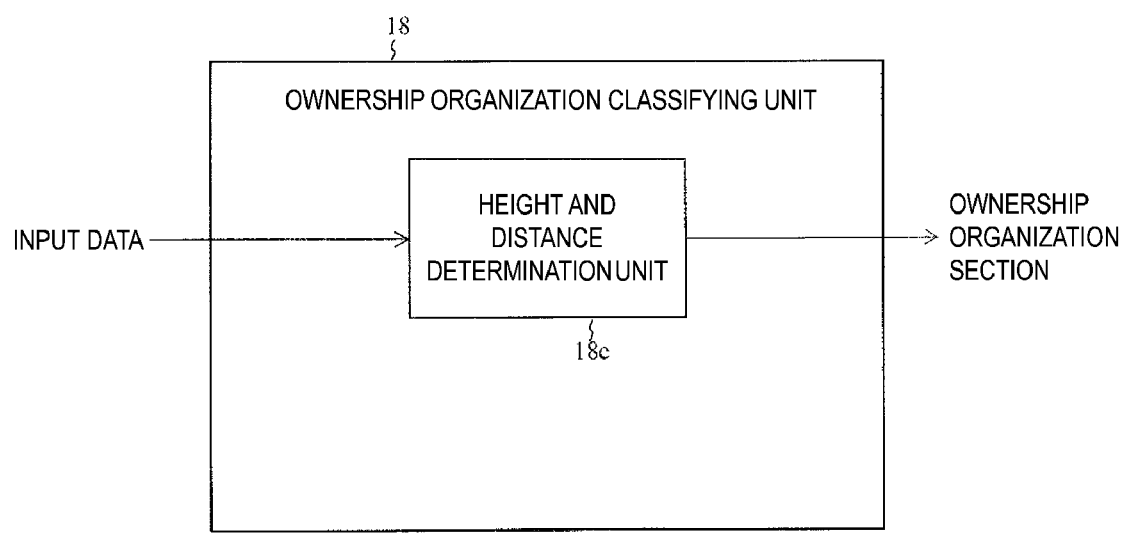
FIG. 17 is a view illustrating an ownership organization classifying unit included in an information processing apparatus according to a fourth embodiment.

In a fourth embodiment, the determination technique 3 will be described. FIG. 17 is a view illustrating the ownership organization classifying unit 18 of the fourth embodiment. In the fourth embodiment, the coordinate of one specific point Q located within a predetermined distance from the columnar structure of the cable spanning the columnar structure is further input to the ownership organization classifying unit 18.

The ownership organization classifying unit 18 includes a height and distance determination unit 18e that, when the height of a top T of the attachment is acquired:
determines, when the height of the top T of the attachment is located within a predetermined range around the height of the specific point Q;
determines, that the owner of the attachment is the same as the owner of the cable, when the height of the top T of the attachment is located below the height of the specific point Q and outside the predetermined range, that the owner of the attachment is the communication company; and
determines, when the height of the top T of the attachment is located above the height of the specific point Q and outside the predetermined range, that the owner of the attachment is the electric power company.

The input data of the fourth embodiment is the solid model of the columnar structure, the solid model of the attachment, the coordinate of one point (specific point Q) on the cable, and the owner of the cable. The cable owner can be perceived by information from the facility DB 20. For example, the specific point Q on the cable is an attaching point to the utility pole. For example, the top T of the attachment is the tip end of the post 32 or an attaching portion to the utility pole 31.

Figure 18:
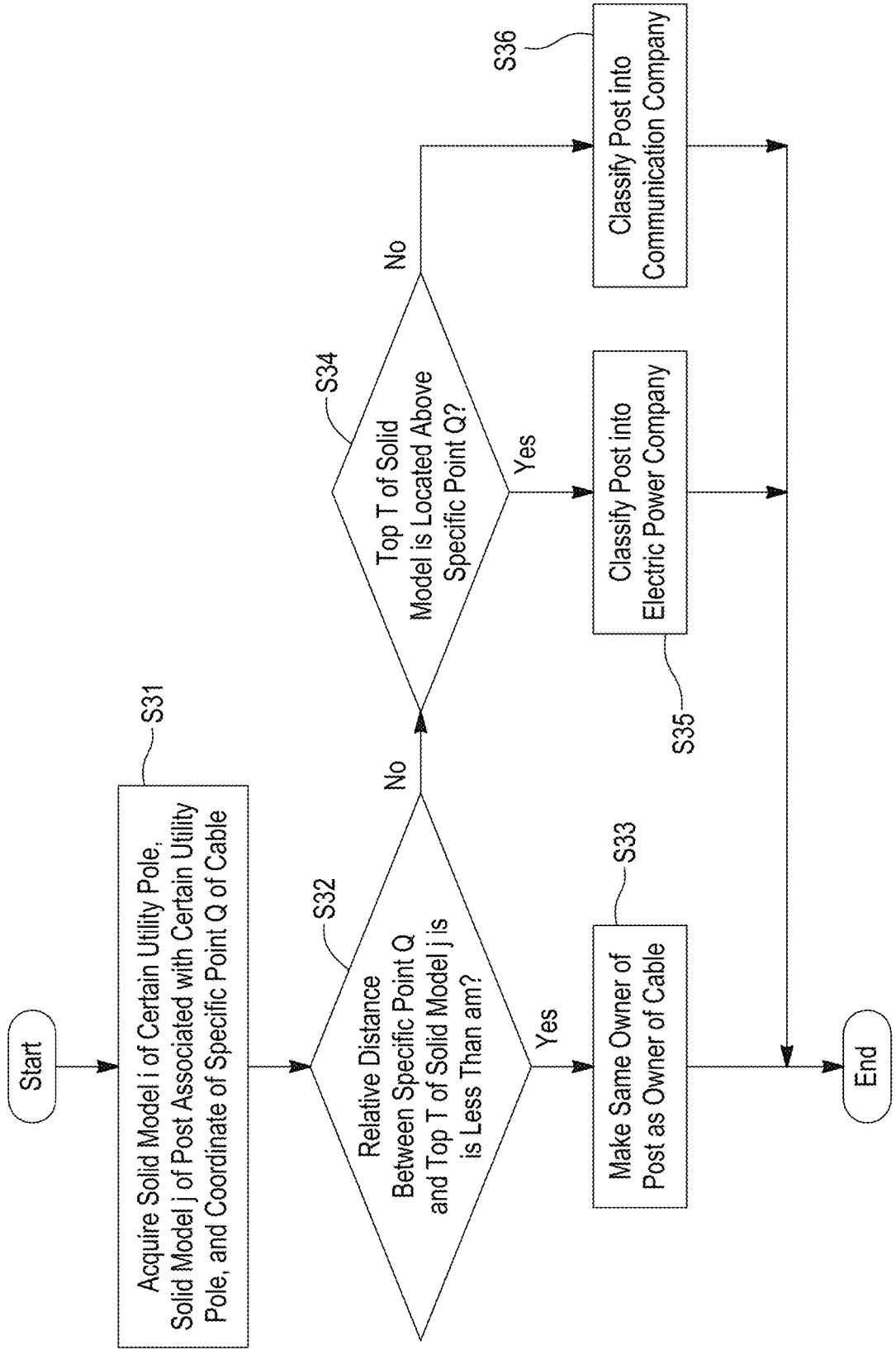
FIG. 18 is a flowchart explaining operations of the ownership organization classifying unit included in the information processing apparatus of the fourth embodiment.

FIG. 18 is a flowchart illustrating the operation of the ownership organization classifying unit 18 of the fourth embodiment.

Figure 19:
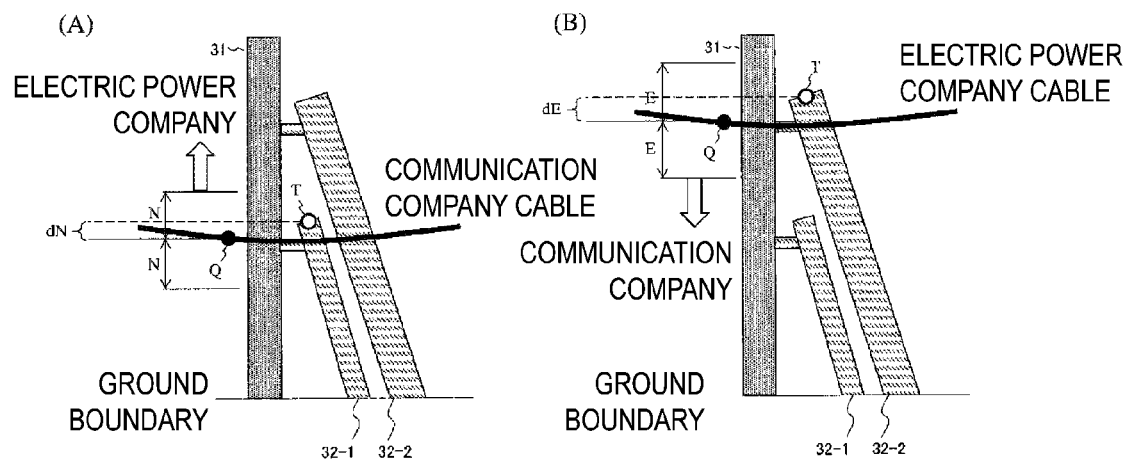
FIG. 19 is a view illustrating the operation of the ownership organization classifying unit included in the information processing apparatus of the fourth embodiment.

FIG. 19 is a view illustrating the operation of the height and distance determination unit 18e. Note that N=E=α. For example, α=0.3 m. The height and distance determination unit 18e compares the relationship between the height of the cable and the height of the attachment, and performs the determination by applying the comparison result to the determination criterion. In the fourth embodiment, an example in which the columnar structure is a utility pole and an attachment is a post or a branch line will be described. The cable of the communication company is suspended below in the case of FIG. 19(A), and the cable of the electric power company is suspended above in the case of FIG. 19(B). The height and distance determination unit 18e acquires coordinates of the solid model of one utility pole 31, the solid model of the post 32-1, the solid model of the post 32-2, and the coordinate of the specific point Q of the cable (step S31).

The height and distance determination unit 18e acquires relative distances dN to dE with respect to the height direction between the specific point Q and the top T of the solid model of the post. Then, the height and distance determination unit 18e determines whether the relative distances dN to dE are less than a (step S32). When the relative distance dN or dE is less than a ("Yes" in step S32), the owners of the posts (32-1, 32-2) is the same as the owner of the cable (step S33). In other words, the post 32-1 is the same owner as the cable in the state of FIG. 19(A), and the post 32-2 is the same owner as the cable in the state of FIG. 19(B).

On the other hand, when the relative distances dN to dE are greater than or equal to a ("No" in step S32), the height and distance determination unit 18e compares the top T to the specific point Q (step S34). The height and distance determination unit 18e determines that the owner of the post is the electric power company when the top T is located above the specific point Q (step S35), and determines that the owner of the post is the communication company when the top T is located below the specific point Q (step S36). In other words, the post 32-2 is owned by the electric power company possession in the state of FIG. 19(A), and the post 32-1 is owned by the communication company in the state of FIG. 19(B).

FIG. 20 is a view illustrating a determination criterion performed by the height and distance determination unit 18e.

In the fourth embodiment, the attachment is described as the post, but the same applies to the case where the attachment is the branch line.

Fifth Embodiment

Figure 21:
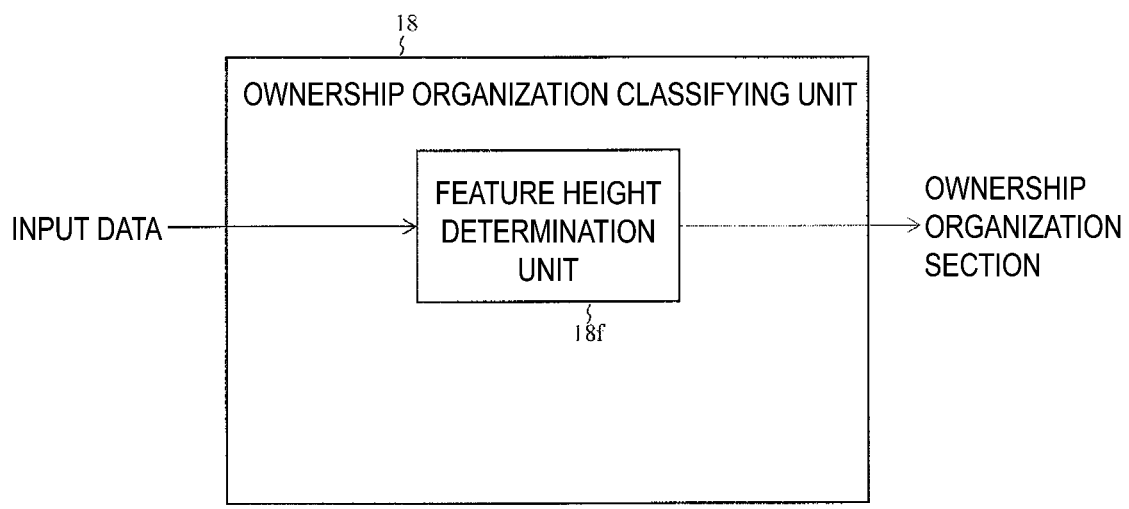
FIG. 21 is a view illustrating an ownership organization classifying unit included in an information processing apparatus according to a fifth embodiment.

In a fifth embodiment, the above-described determination technique 4 will be described. FIG. 21 is a view illustrating the ownership organization classifying unit 18 of the fifth embodiment. The ownership organization classifying unit 18 includes a feature height determination unit 18f. At this point, the feature height determination unit 18f,
when a feature S in which a standard exists at a height from the ground boundary is being attached to the columnar structure,
acquires a difference d between the height of the top T of the attachment and the height of the feature S, and compares the difference d to a threshold determined by the feature S to determine whether the owner of the attachment is the communication company or the electric power company.

Figure 22:
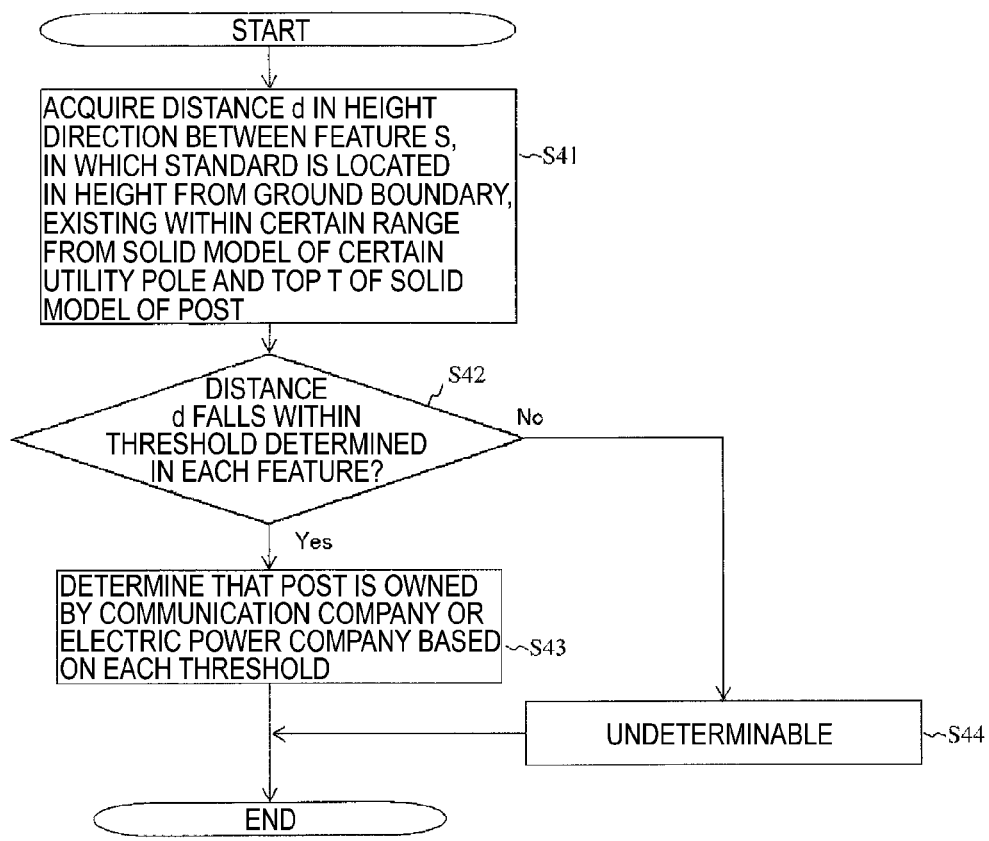
FIG. 22 is a flowchart illustrating the operation of the ownership organization classifying unit included in the information processing apparatus of the fifth embodiment.

The input data of the fifth embodiment is the solid model of the columnar structure, the solid model of the attachment, the height of the feature, and the owner of the columnar structure. FIG. 22 is a flowchart illustrating the operation of the ownership organization classifying unit 18 of the fifth embodiment.

Figure 23:
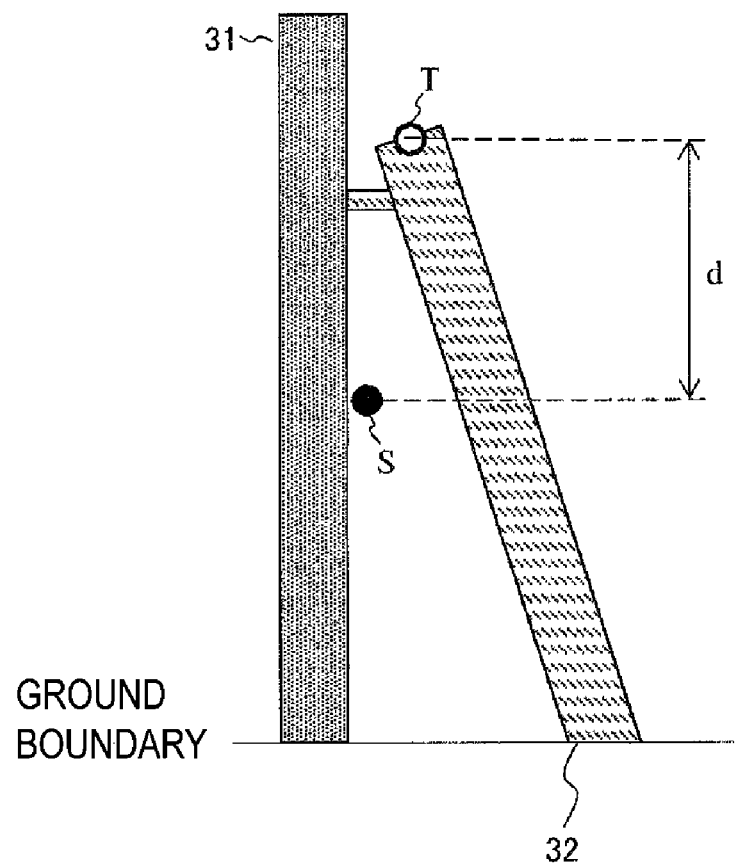
FIG. 23 is a view illustrating the operation of the ownership organization classifying unit included in the information processing apparatus of the fifth embodiment.

FIG. 23 is a view illustrating the operation of the feature height determination unit 18f. The feature height determination unit 18f acquires the difference d between the feature S in which the standard exists at the height from the feature and the top T of the attachment. In the fifth embodiment, an example in which the columnar structure is a utility pole and an attachment is a post or a branch line will be described. As illustrated in FIG. 23, the post 32 and the feature S are attached to the utility pole 31. The feature height determination unit 18f acquires the solid model of certain utility pole 31 and the solid model of the post 32 associated with the certain utility pole 31, and acquires a difference d between the feature S and the top T of the post 32 from these solid models (step S31). The feature height determination unit 18f can be perceived whether the feature S is attached to the utility poles 31 by the information about the facility DB 20.

The feature height determination unit 18f compares the threshold and the distance d as follows (step S42), and determines the owner of the post (step S43).

(1) In the case where the feature is a number ticket,
the feature height determination unit 18f sets the threshold to β, determines the post 32 as the communication company when d<β, and determines the post 32 as the electric power company when d≥β. For example, β=4.0 m.

(2) In the case where the feature is the ground (ground boundary),
the feature height determination unit 18f sets the threshold to γ, determines the post 32 as the communication company when d<γ, and determines the post 32 as the electric power company when d≥γ. For example, γ=7.0 m.

(3) In the case where the feature is a nameplate,
the feature height determination unit 18f sets the threshold to h1, determines the post 32 as the communication company when d<h1, and determines the post 32 as the electric power company when d≥h1. For example, h is set between 1.74 m and 4.74 m.

(4) In the case where the feature is the tip end of the utility pole,
the feature height determination unit 18f sets the threshold to h2, determines the post 32 as the communication company when d≥h2, and determines the post 32 as the electric power company when d<h2. For example, h2 is set between 0.33 m and 9.2 m.

When the distance d does not fall within the threshold ("No" in step S42), the feature height determination unit 18f outputs undeterminable (step S44).

In the fifth embodiment, the attachment is described as the post, but the same applies to the case where the attachment is the branch line.

Sixth Embodiment

In a sixth embodiment, the technique of selecting the attachment in the solid models generated by the model extraction unit 13 will be described.

Figure 24:
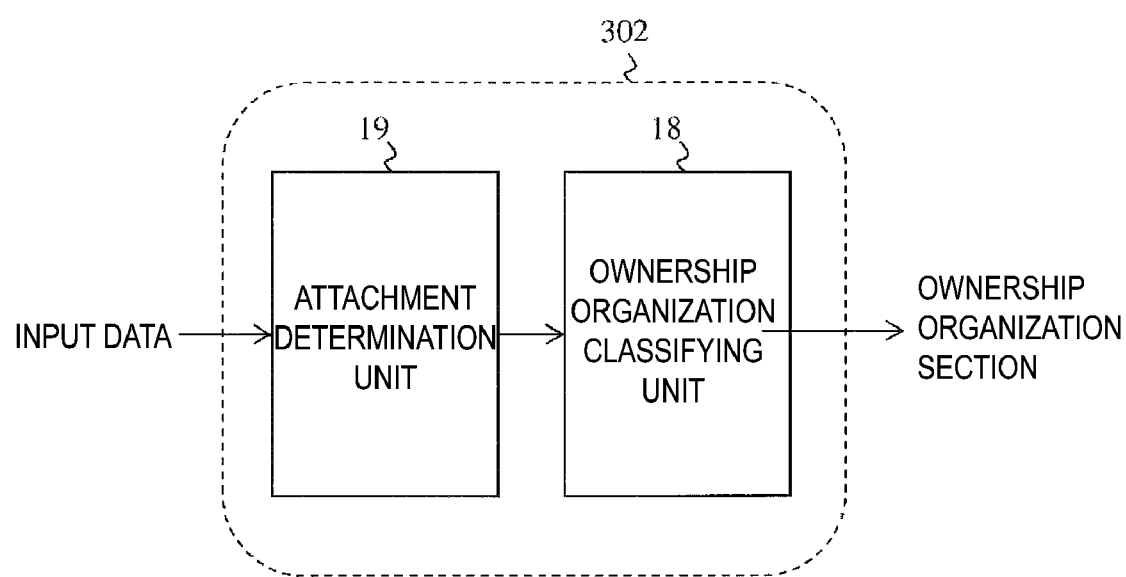
FIG. 24 is a block diagram illustrating a configuration of a functional circuit of an information processing apparatus according to a sixth embodiment.

FIG. 24 is a view illustrating an information processing apparatus 302 of the sixth embodiment. The information processing apparatus 302 further includes an attachment determination unit 19 to which a solid model of a structure extracted as other than the columnar structure from the three-dimensional point group data is input, the attachment determination unit 19 calculating an inclination of the solid model and determining that the structure is the attachment based on the inclination.

Figure 25:
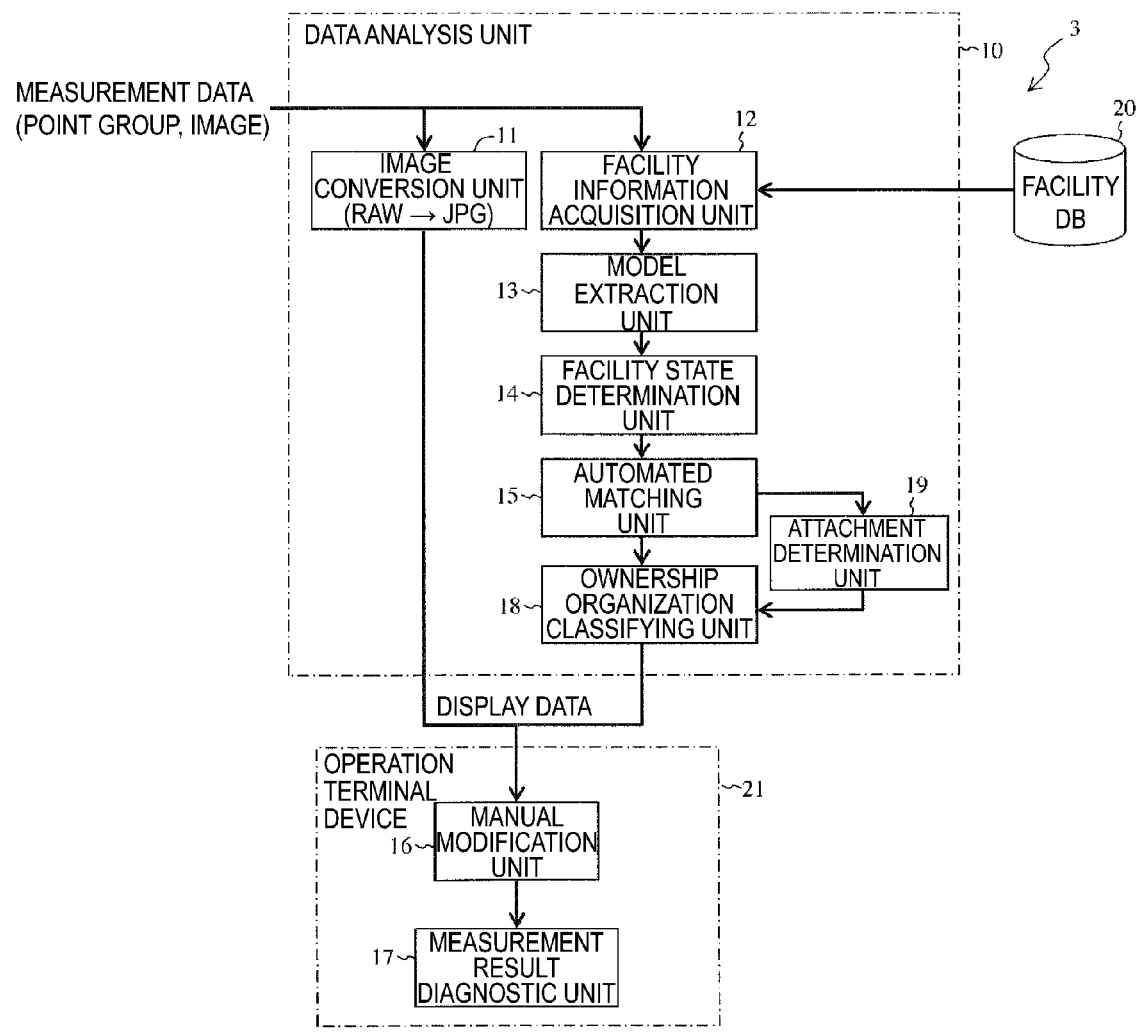
FIG. 25 is a view illustrating a system of the information processing apparatus of the sixth embodiment.

The information processing apparatus 302 may specifically be the management server system such as that illustrated in FIG. 1. FIG. 25 is a view illustrating the case in which the information processing apparatus 302 is a management server system. In a management server system 3, the ownership organization classifying unit 18 is located at the same location as the management server system 2 in FIG. 10 and performs the same operation. In the management server system 3, the attachment determination unit 19 is disposed at the rear stage of the automated matching unit 15, and the input data is input from the automated matching unit 15. The input data is the solid model of the columnar structure and the solid models of other structures (other than the columnar structure) that are not named by the automated matching unit 15.

The attachment determination unit 19 grasps the positional relationship and inclinations of the columnar structure and other structures from the input solid model, and determines whether other structures are the attachment of the columnar structure. The attachment determination unit 19 can determine whether other structures are the attachment of the columnar structure by, for example,
(determination technique A) the determination using the distance between the solid models and an inclination direction vector of solid models of other structures, or
(determination technique B) the determination using the reference axis of the solid model of the columnar structure and other structures.

Seventh Embodiment

Figure 26:
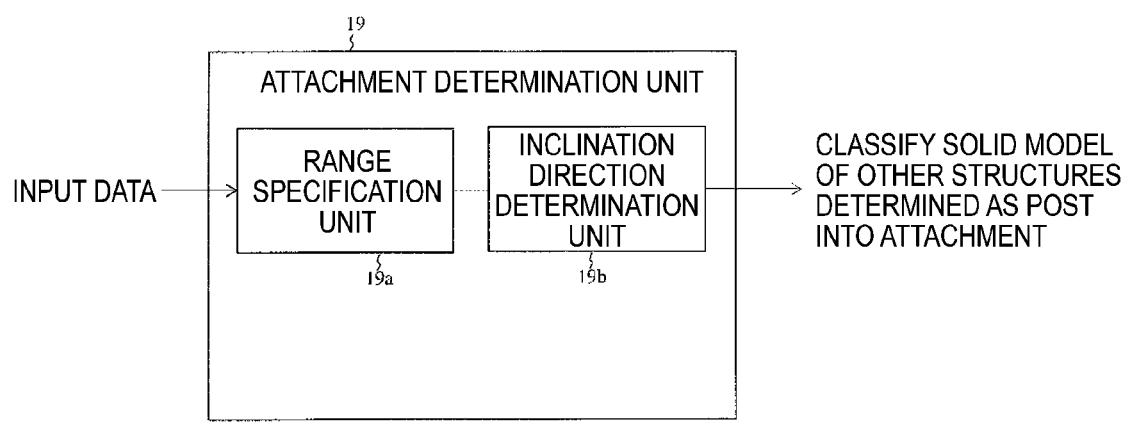
FIG. 26 is a view illustrating an attachment determination unit included in an information processing apparatus according to a seventh embodiment.

In a seventh embodiment, the determination technique A will be described. FIG. 26 is a view illustrating the attachment determination unit 19 of the seventh embodiment. The attachment determination unit 19 includes a range specification unit 19a and an inclination direction determination unit 19b. The input data is the solid model of the columnar structure and the solid model of other structures.

Figure 27:
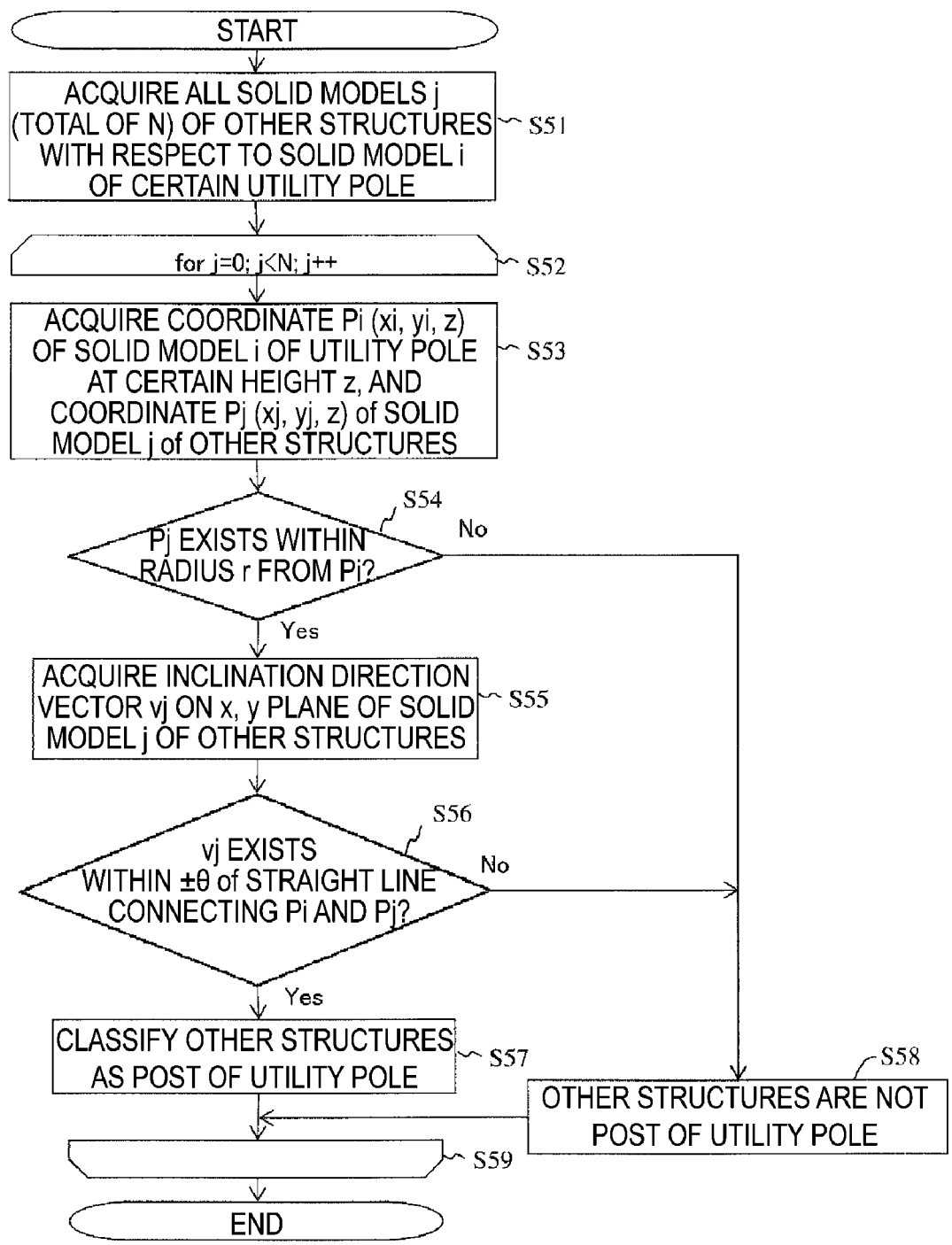
FIG. 27 is a flowchart illustrating the operation of the attachment determination unit included in the information processing apparatus of the seventh embodiment.

FIG. 27 is a flowchart illustrating the operation of the attachment determination unit 19 of the seventh embodiment.

FIG. 28 is a view illustrating the operation of the attachment determination unit 19. The attachment determination unit 19 acquires coordinates of the columnar structure and other structures on the slice plane when the solid model is sliced at a predetermined height (may be the case of the ground boundary) from the ground boundary, and makes other structures proximate to the columnar structure as a candidate for the attachment. In the seventh embodiment, an example in which the columnar structure is a utility pole and an attachment is a post or a branch line will be described.

FIG. 28(A) is a view illustrating the operation of the range specification unit 19a. The range specification unit 19a selects one solid model of the utility pole from the input solid models (steps S51, S52). Then, the range specification unit 19a acquires the coordinate (for example, a center coordinate Pj on the slice plane) of the solid model of the utility pole at the height z and the coordinate (for example, a center coordinate Pi on the slice plane) of the solid model of the structure other than the utility pole (other structures) (step S53). Then, the range specification unit 19a makes the solid model of the Pj included in a fixed distance r from Pi as the post candidate of the utility pole ("Yes" in step S54), and makes the other as not the post of the utility pole ("No" in step S54, step S58). In FIG. 28(A), the range specification unit 19a selects the structure 32-1 and the structure 32-2 existing in the radius r from the utility pole 31 as the solid model of the post candidate.

FIG. 28(B) is a view illustrating the operation of the inclination direction determination unit 19b. The inclination direction determination unit 19b acquires the inclination of the solid model of the post candidate selected by the range specification unit 19a, and acquires an XY component of the inclination (component on the slice plane) as an inclination direction vector in which Pj is set to a starting point (step S55). Then, the inclination direction determination unit 19b compares the straight line connecting Pi and Pj with the inclination direction vector, and determines whether an endpoint of the inclination direction vector exists within a certain range (±θ) with respect to the straight line around Pj (step S56). The post candidate in which the endpoint of the inclination direction vector exists within the certain range (±θ) is determined to be the post of the utility pole ("Yes" in step S56, step S57), and the other is determined to be not the post of the utility pole ("No" in step S56, step S58). In FIG. 28(B), the inclination direction determination unit 19b selects the post candidate 32-1 as the solid model of the attachment (post) because the inclination direction vector of the post candidate 32-1 exists within the certain range (±θ).

The attachment determination unit 19 repeats steps S52 to S59 for the solid models (N) of all other structures. The attachment determination unit 19 notifies the ownership organization classifying unit 18 of the solid model of the structure determined as the post.

In the seventh embodiment, the attachment is described as the post, but the same applies to the case where the attachment is the branch line.

Eighth Embodiment

Figure 29:
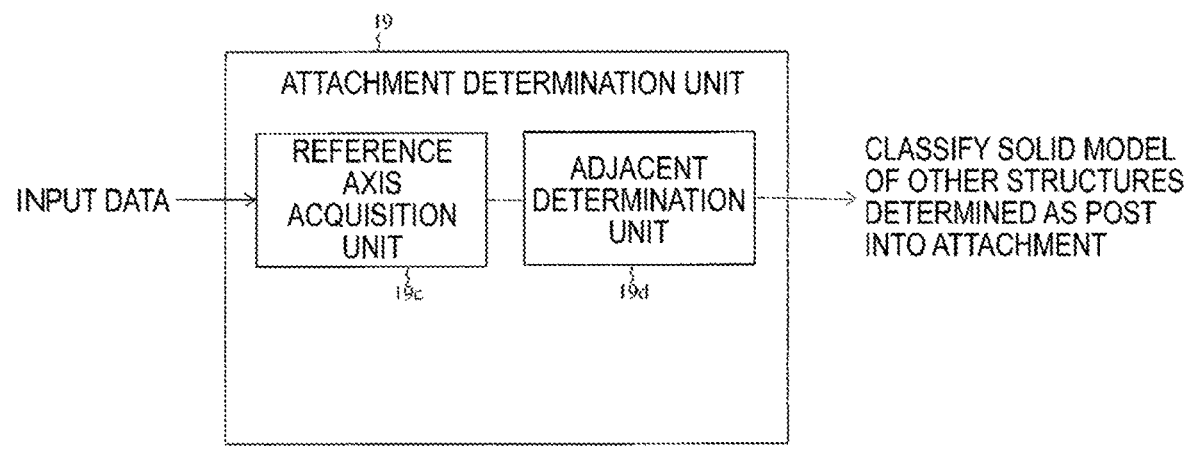
FIG. 29 is a view illustrating an attachment determination unit included in an information processing apparatus according to an eighth embodiment.

In an eighth embodiment, the determination technique B will be described. FIG. 29 is a view illustrating the attachment determination unit 19 of the eighth embodiment. The attachment determination unit 19 includes a reference axis acquisition unit 19c and an adjacent determination unit 19d. The input data is the solid model of the columnar structure and the solid models of other structures.

Figure 30:
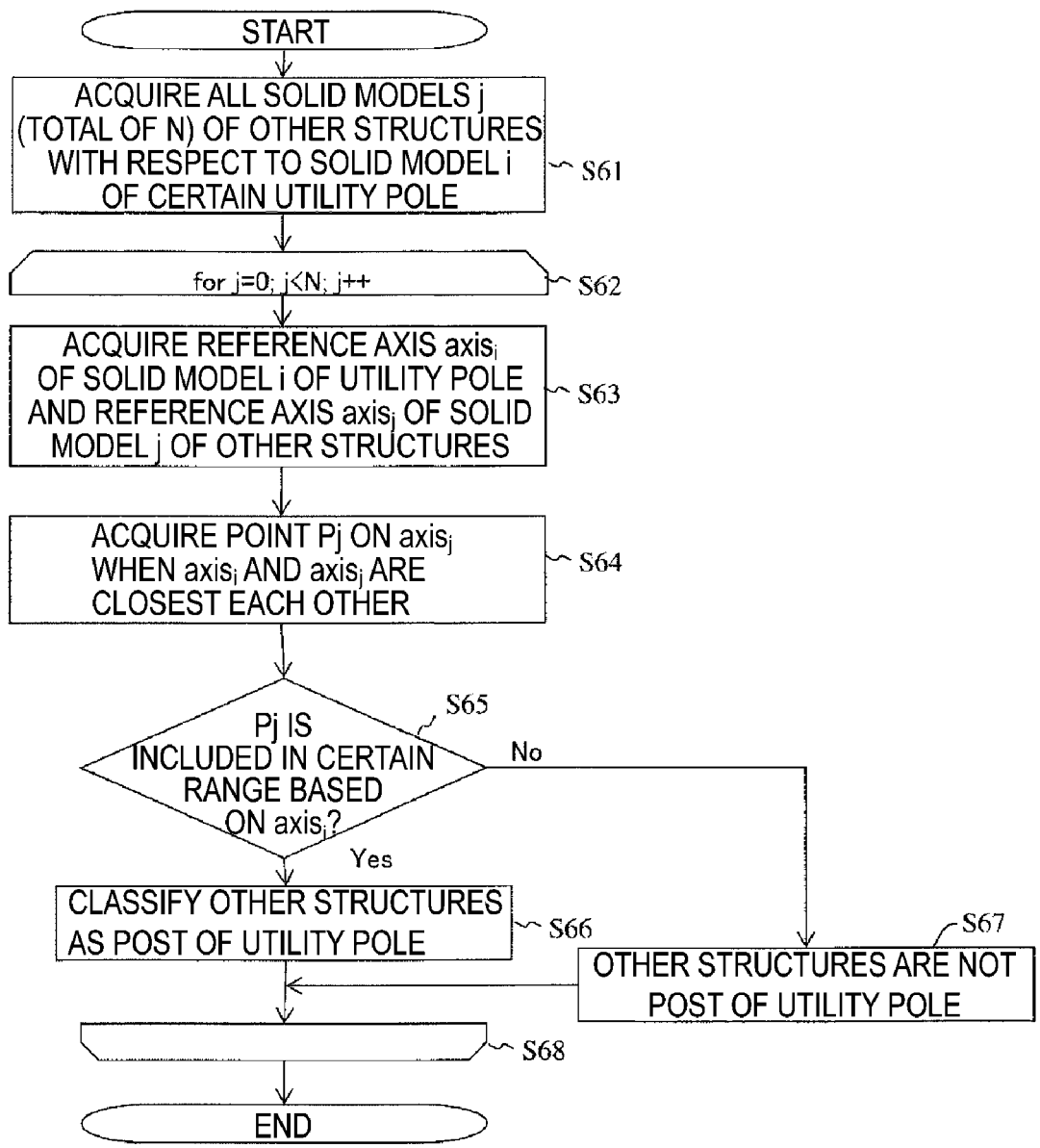
FIG. 30 is a flowchart illustrating the operations of the attachment determination unit included in the information processing apparatus of the eighth embodiment.

FIG. 30 is a flowchart illustrating the operation of the attachment determination unit 19 of the eighth embodiment.

Figure 31:
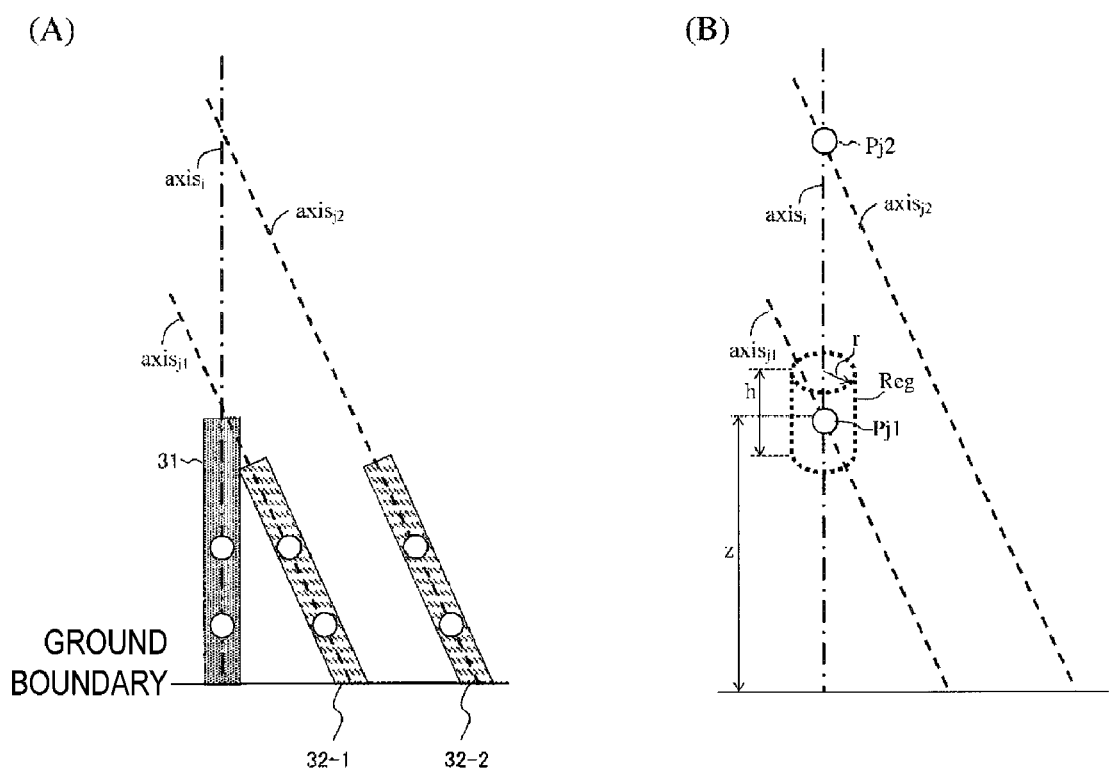
FIG. 31 is a view illustrating the operation of the attachment determination unit included in the information processing apparatus of the eighth embodiment.

FIG. 31 is a view illustrating the operation of the attachment determination unit 19. The attachment determination unit 19 acquires the reference axes of the solid models of the columnar structure and other structures, and determines other structures having the reference axis that intersects or is close to the reference axis of the columnar structure as the attachment. In the eighth embodiment, an example in which the columnar structure is a utility pole and an attachment is a post or a branch line will be described.

FIG. 31(A) is a view illustrating the operation of the reference axis acquisition unit 19c. The reference axis acquisition unit 19c selects the solid model of the utility pole in one of the input solid models (steps S61, S62). Then, the reference axis acquisition unit 19c acquires a line connecting two points (for example, the center points during slicing by heights z1 and z2) in the solid model of the utility pole 31 as a reference axis $axis_i$, and a line connecting two points (for example, the center point during slicing by heights z1 and z2) in the solid model of other structures (32-1, 32-2) as a reference axis $axis_j$ (step S63). In FIG. 31(A), the reference axis acquisition unit 19a acquires a reference axis $axis_i$ of the utility pole 31, a reference axis $axis_{j1}$ of the structure 32-1, and a reference axis $axis_{j2}$ of the structure 32-2.

FIG. 31(B) is a view illustrating the operation of the adjacent determination unit 19d. The adjacent determination unit 19d specifies a certain range Reg to a predetermined height z of a reference axis $axis_i$ of the utility pole 31. The certain range Reg may be a sphere having a radius r or a cylinder having the radius r as in FIG. 31(B). The r, z, and h of the certain range Reg may be preset. Furthermore, the adjacent determination unit 19d acquires the point Pj on the reference axis $axis_j$, in which the reference axis $axis_i$ and the $axis_j$ are closest to each other (step S64). In FIG. 31(B), the closest point Pj 1 between the reference axis $axis_i$ and the $axis_{j1}$ and the closest point Pj2 of the reference axis $axis_i$ and the $axis_{j2}$ are acquired.

The adjacent determination unit 19d makes the solid model of the reference axis $axis_j$ of the closest point Pj included in the certain range Reg as the solid model of the attachment ("Yes" in step S65, step S66), and makes the solid model of other reference axes $axis_j$ as the solid model that is not the attachment ("No" in step S65, step S67). In FIG. 31(B), the structure 32-1 is determined to be the post of the utility pole 31 because the closest point Pj1 is included in the certain range Reg. On the other hand, the structure 32-2 is determined not to be the post of the utility pole 31 because the closest point Pj2 is not included in the certain range Reg.

The attachment determination unit 19 repeats steps S62 to S68 for the (N) solid models of all other structures. The attachment determination unit 19 notifies the ownership organization classifying unit 18 of the solid model of the structure determined as the post.

In the eighth embodiment, the attachment is described as the post, but the same applies to the case where the attachment is the branch line.

Ninth Embodiment

The information processing apparatus (301, 302) can be implemented by a computer and a program, and the program can be recorded in a recording medium or provided through a network.

Figure 32:
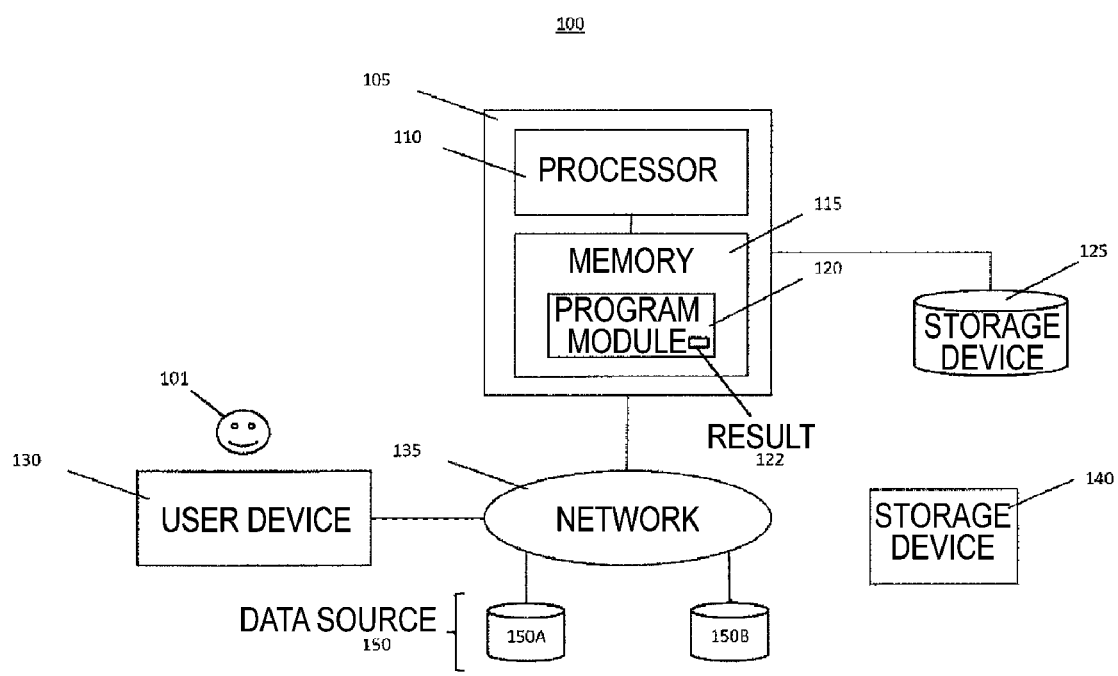
FIG. 32 is a view illustrating an information processing apparatus according to a ninth embodiment.

FIG. 32 is a block diagram illustrating a system 100. The system 100 includes a computer 105 connected to a network 135.

The network 135 is a data communication network. The network 135 may be a private network or a public network and can include any one or all of (a) a personal area network covering a certain room, for example, (b) a local area network covering a certain building, for example, (c) a campus area network covering a certain campus, for example, (d) a metropolitan area network covering a certain city, for example, (e) a wide area network covering areas that connect across boundaries of an urban area, a rural area, or a nation, for example, or (f) the Internet. The communication is performed by electronic signals and optical signals via the network 135.

The computer 105 includes a processor 110 and a memory 115 connected to the processor 110. Although the computer 105 is represented herein as a standalone device, it is not so limited, but rather may be connected to other devices not illustrated in a distributed processing system.

The processor 110 is an electronic device configured with logic circuit that responds to and executes instructions.

The memory 115 is a storage medium readable to a tangible computer with a computer program encoded therein. In this regard, the memory 115 stores data and instructions, that is program code, readable and executable by the processor 110 to control operation of the processor 110. The memory 115 can be implemented in a random access memory (RAM), a hard drive, a read-only memory (ROM), or a combination thereof. One of components of the memory 115 is a program module 120.

The program module 120 includes instructions for controlling the processor 110 to execute the processes described herein. Although operations are described herein as being performed by the computer 105 or a method or a process or a sub-process thereof, the operations are actually performed by the processor 110.

The term "module" is used herein to refer to a functional operation that can be embodied as either a stand-alone component or an integrated configuration of a plurality of lower components. Therefore, the program module 120 may be achieved as a single module or as a plurality of modules that operate in cooperation with each other. Moreover, while the program module 120 is described herein as being installed in the memory 115 and thus implemented in software, it is also possible to be implemented in any of hardware (for example, electronic circuit), firmware, software, or a combination thereof.

Although the program module 120 is illustrated as already being loaded into the memory 115, it may be configured to be located on a storage device 140 so as to be later loaded into the memory 115. The storage device 140 is a storage medium readable to a tangible computer storing the program module 120. Examples of the storage device 140 include a compact disc, a magnetic tape, a read-only memory, an optical storage media, a memory unit composed of a hard drive or a plurality of parallel hard drives, and a universal serial bus (USB) flash drive. Alternatively, the storage device 140 may be a random access memory or another type of electronic storage device that is located in a remote storage system not illustrated, and is connected to the computer 105 via the network 135.

The system 100 further includes a data source 150A and a data source 150B collectively referred to as a data source 150 herein and communicatively connected to the network 135. In practice, the data source 150 can include any number of data sources, that is, one or more data sources. The data source 150 can include unstructured data and include social media.

The system 100 further includes a user device 130 operated by a user 101 and connected to the computer 105 via the network 135. The user device 130 includes an input device, such as a keyboard or speech recognition subsystem, for enabling the user 101 to transmit information and a selection of command to the processor 110. The user device 130 further includes an output device, such as a display device or a printer or an audio synthesizer. A cursor control unit, such as a mouse, a trackball, or a touch sensitive screen, allows the user 101 to manipulate the cursor on the display device to transmit additional information and a selection of command to the processor 110.

The processor 110 outputs a result 122 of execution of the program module 120 to the user device 130. Alternatively, the processor 110 can provide output to a storage device 125, for example a database or a memory, or can provide output to a remote device not illustrated via the network 135.

For example, the program module 120 may be the program that executes the flowcharts of FIGS. 12, 15, 18, 22, 27, and 30. The system 100 can be operated as the information processing apparatus (301, 302).

The terms "includes" or "including", or "comprises" or "comprising" specifies that features, integers, steps, or components described therein are present, but should be interpreted that they do not exclude the presence of one or more other features, integers, steps, or components, or groups thereof. The terms "a" and "an" are indefinite articles and therefore do not exclude embodiments having a plurality thereof.

OTHER EMBODIMENTS

Note that the present invention is not limited to the above-described embodiments, and can be variously modified and implemented within the scope not departing from the gist of the present invention. In short, the present invention is not limited to the higher-level embodiment as it is, and can be embodied, at the implementation stage, with the components modified within the scope not departing from the gist thereof.

Various inventions can be formed by appropriate combinations of a plurality of components disclosed in the above-described embodiments. For example, several components may be deleted from all of the components illustrated in the embodiments. Furthermore, components of different embodiments may be appropriately combined with each other.

REFERENCE SIGNS LIST

1: Management server system
2, 3: Management server system
10: Data analysis unit
11: Image conversion unit
12: Facility information acquisition unit
13: Model extraction unit
14: Facility state determination unit
15: Automated matching unit
16: Manual modification unit
17: Measurement result diagnostic unit
18: Ownership Organization classifying unit
18a: Coordinate acquisition unit
18b: Distance determination unit
18c: Reference axis acquisition unit 18d: Height determination unit
18e: Height and distance determination unit
18f: Feature height determination unit
19: Attachment determination unit
19a: Range specification unit
19b: Inclination direction determination unit
19c: Reference axis acquisition unit
19d: Adjacent determination unit
20: Facility database (DB)
21: Operation terminal device
31: Columnar structure (utility pole)
32, 32-1 to 32-5: Other structures, attachment (post)
100: System
101: User
105: Computer
110: Processor
115: Memory
120: Program module
122: Result
125: Storage device
130: User device
135: Network
140: Storage device
150: Data source
301, 302: Information processing apparatus

The invention claimed is:

1. An information processing apparatus comprising
a processor; and
a storage medium having computer program instructions stored thereon, when executed by the processor, perform to:
receive, from a mobile mapping system (MMS) measurement data including three-dimensional point group data including a columnar structure and raw image data;
convert the raw image data into Joint Photographic Experts Group (GPEG) data that is irreversibly compressed;
read two-dimensional data regarding a local region from a two-dimensional facility database;
from the three-dimensional point group data, creates a solid model of the columnar structure and a solid model of an attachment attached to the columnar structure;
determine a positional relationship between the columnar structure and the attachment from the solid models; and
determine an owner of the attachment from the positional relationship.

2. The information processing apparatus according to claim 1, wherein the computer program instructions further perform to acquire coordinates of the columnar structure and the attachment at a slice plane when the solid models are sliced at a predetermined height from a ground boundary; and
calculate a distance between the columnar structure and the attachment at the slice plane from the coordinates, when the distance is shorter relative to a threshold, determine the owner of the attachment as a communication company, and when the distance is longer relative to the threshold, determine the owner of the attachment as an electric power company.

3. The information processing apparatus according to claim 1, wherein the computer program instructions further perform to acquire reference axes of the columnar structure and the attachment from the solid models; and
detect a closest point between the reference axis of the columnar structure and the reference axis of the attachment, and determine, when the two closest points exist, the owner of the attachment forming the closest point having a higher altitude as an electric power company, and the owner of the attachment forming the closest point having a lower altitude as an communication company.

4. The information processing apparatus according to claim 1, wherein a coordinate of one specific point of a cable spanning the columnar structure is further input to the ownership organization classifying unit, the one specific point existing within a predetermined distance from the columnar structure, and
the computer program instructions performs to, when a height of a top of the attachment is acquired:
determine, when the height of a top of the attachment is acquired exists within a predetermined range around a height of the specific point, that the owner of the attachment is identical to an owner of the cable,
determine, when the height of the top of the attachment is lower than the height of the specific point and outside the predetermined range, that the owner of the attachment is a communication company, and
determine, when the height of the top of the attachment is higher than the height of the specific point and outside the predetermined range, that the owner of the attachment is an electric power company.

5. The information processing apparatus according to claim 1, wherein the computer program instructions further perform to:
when a feature in which a standard exists in a height from a ground boundary is being attached to the columnar structure,
acquire a difference between a height of a top of the attachment and a height of a feature, compare the difference to a threshold determined by the feature, and determine whether the owner of the attachment is a communication company or an electric power company.

6. The information processing apparatus according to claim 1 wherein the computer program instructions further perform to receive a solid model of a structure extracted as other than the columnar structure from the three-dimensional point group data is input, calculate an inclination of the solid model and determine that the structure is the attachment based on the inclination.

7. An information processing method comprising:
receiving, from a mobile mapping system (MMS) measurement data including three-dimensional point group data including a columnar structure and raw image data;
converting the raw image data into Joint Photographic Experts Group (GPEG) data that is irreversibly compressed;
reading two-dimensional data regarding a local region from a two-dimensional facility database;
from the three-dimensional point group data, creating a solid model of the columnar structure and a solid model of an attachment attached to the columnar structure;
determining a positional relationship of the columnar structure and the attachment from the solid models; and
determining an owner of the attachment from the positional relationship.

8. A non-transitory computer-readable medium having computer-executable instructions that, upon execution of the instructions by a processor of a computer, cause the computer to function as the information processing apparatus according to claim 1.

* * * * *